(12) United States Patent
Kubo

(10) Patent No.: US 9,316,895 B2
(45) Date of Patent: Apr. 19, 2016

(54) IMAGE PROJECTION APPARATUS WITH AN ENCLOSURE AND AIR SUPPLY

(71) Applicant: Yoshio Kubo, Tokyo (JP)

(72) Inventor: Yoshio Kubo, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 139 days.

(21) Appl. No.: 14/133,890

(22) Filed: Dec. 19, 2013

(65) Prior Publication Data

US 2014/0218693 A1   Aug. 7, 2014

(30) Foreign Application Priority Data

Feb. 4, 2013   (JP) .................................. 2013-019404

(51) Int. Cl.
*G03B 21/16*   (2006.01)
*G03B 21/28*   (2006.01)

(52) U.S. Cl.
CPC ................. *G03B 21/16* (2013.01); *G03B 21/28* (2013.01)

(58) Field of Classification Search
CPC ........ G03B 21/16; G03B 21/14; G03B 21/00; G03B 21/28; H04N 5/74
See application file for complete search history.

(56) References Cited

U.S. PATENT DOCUMENTS

| | | | |
|---|---|---|---|
| 2003/0218863 A1* | 11/2003 | Hutchinson et al. | 361/695 |
| 2006/0066818 A1* | 3/2006 | Nakamura et al. | 353/97 |
| 2008/0284950 A1* | 11/2008 | Itoh | 349/96 |

FOREIGN PATENT DOCUMENTS

| | | | |
|---|---|---|---|
| JP | 2001242434 A | * | 9/2001 |
| JP | 2004-012750 | | 1/2004 |
| JP | 2004-279695 | | 10/2004 |
| JP | 2005-141065 | | 6/2005 |
| JP | 2005249259 A | * | 9/2005 |
| JP | 2006058896 A | * | 3/2006 |
| JP | 2006-119676 | | 5/2006 |
| JP | 2007-034318 | | 2/2007 |
| JP | 2010-020344 | | 1/2010 |

* cited by examiner

*Primary Examiner* — Sultan Chowdhury
*Assistant Examiner* — Danell L Owens
(74) *Attorney, Agent, or Firm* — Oblon, McClelland, Maier & Neustadt, L.L.P

(57) ABSTRACT

An image projection apparatus includes an optical part disposed in a light path of an projection image; an enclosing unit to enclose the light path of the projection image and having an window for projecting the projection image onto a projection plane; and an air supply unit to supply air into an internal space of the enclosing unit enclosing the light path. Pressure of the internal space of the enclosing unit is kept at a positive pressure with respect to an external pressure of the enclosing unit during an image projection operation.

17 Claims, 18 Drawing Sheets

IMAGE PROJECTION APPARATUS WITH AN ENCLOSURE AND AIR SUPPLY

CROSS-REFERENCE TO RELATED APPLICATION

This application claims priority pursuant to 35 U.S.C. §119 to Japanese Patent Application No. 2013-019404, filed on Feb. 4, 2013 in the Japan Patent Office, the disclosure of which is incorporated by reference herein in its entirety.

BACKGROUND

1. Technical Field

The present invention relates to an image projection apparatus.

2. Background Art

Some image projection apparatuses include a box-shaped enclosing unit such as a mirror box that retains optical parts such as a co-axial lens and a curved mirror and has an opening on a top face of the enclosing unit used for exiting a projection image. Further, the image projection apparatuses may include a shutter to cover the opening of the mirror box, an air supply unit such as an air supply fan to inflow air into the mirror box.

The shutter closes the opening when a projection image is not projected to a screen, with which dust intrusion into the mirror box through the opening when the image projection apparatus is stopped can be prevented. When a projection image is being projected onto the screen, the air supply fan inflows air into the mirror box, with which an internal pressure of the mirror box becomes higher than an external pressure of the mirror box, and the shutter is opened to project an image onto the screen through the opening. When the projection image is projected onto the screen, an airflow flowing from the internal space of the mirror box to the outside of the mirror box is generated at the opening, with which dust intrusion from the opening can be suppressed.

However, in this image projection apparatus disclosed in JP-4018459-B (JP-2004-12750-A), air supplied from the air supply fan directly flows to the opening, further, an area of the opening for exiting the projection image is greater than an area of an opening for discharging air from the air supply fan. Therefore, when an image is being projected by opening the shutter, air supplied into the mirror box from the air supply fan may not remain in the mirror box effectively but may be exhausted from the opening. Therefore, it becomes difficult to maintain the internal pressure of the mirror box higher than the external pressure outside the mirror box, and resultantly, an airflow flowing into the mirror box from the outside of the mirror box may occur at an edge of the opening, and dust intrusion into the mirror box through the opening may occur. The dust intruded through the opening may adhere on optical parts, with which the projection image quality may deteriorate.

SUMMARY

In one aspect of the present invention, an image projection apparatus is devised. The image projection apparatus includes an optical part disposed in a light path of an projection image; an enclosing unit to enclose the light path of the projection image and having an window for projecting the projection image onto a projection plane; and an air supply unit to supply air into an internal space of the enclosing unit enclosing the light path. Pressure of the internal space of the enclosing unit is kept at a positive pressure with respect to an external pressure of the enclosing unit during an image projection operation.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
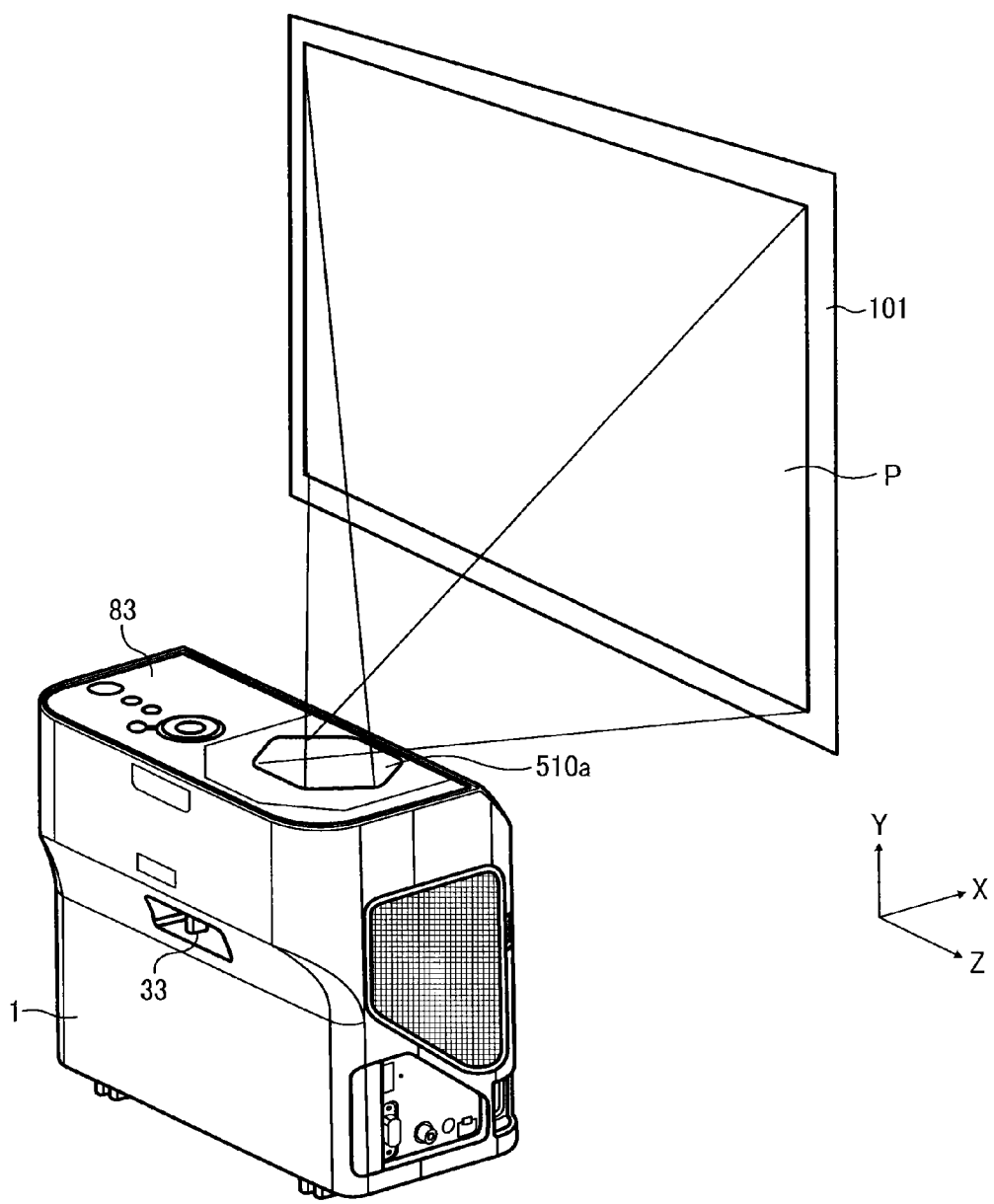
FIG. 1 shows a perspective view of a projector according to an example embodiment and a projection plane.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have the same function, operate in a similar manner, and achieve a similar result.

Referring now to the drawings, a description is given of an apparatus or system for an image projection apparatus such as a projector according to an example embodiment.

FIG. 1 shows a perspective view of a projector 1, used as an image projection apparatus, and a projection plane 101. Hereinafter, the normal line direction of the projection plane 101 is set as X direction, the short side direction of the projection plane 101 (or top/bottom direction) is set as Y direction, and the long side direction of the projection plane 101 (or horizontal direction) is set as Z direction.

The projector 1 can be used to project a projection image P on a screen such as the projection plane 101, in which the projection image P is generated based on image data input to the projector 1 from personal computers, video cameras, or the like. The projector 1 may be available as liquid crystal projectors having liquid crystal panels enhancing resolution, light sources such as lamps enhancing light intensity by high efficient system, and such liquid crystal projectors are available with lower prices. Further, the projector 1 may be available as small light-weight projectors using micro drive mirror devices such as digital micro-mirror device (DMD: registered trademark) Such projectors are widely used in offices, schools, homes. Further, the projector 1 may be available as a front type projector having enhanced portability, which can be used for a small meeting of several participants.

Such projectors are required to project an image on a large screen and to have a smaller projection space outside the projector as much as possible.

Further, to be described later, the projector 1 of an example embodiment includes a light passing optical system such as a projection lens disposed in parallel to the projection plane 101, a reflection mirror to reflect light flux, and a free-curve mirror to enlarge and project the light flux onto the projection plane 101. With this configuration, an optical engine unit can be configured as a smaller vertically-long unit in three-dimensional scale.

The projector 1 includes, for example, an operation unit 83, and a focus lever 33. As shown in FIG. 1, the projector 1 has an exit port 510a on its top face, from which a projection image P is projected onto the projection plane 101. The projection image P projected from the exit port 510a is displayed on the projection plane 101 such as a screen. Further, the projector 1 has the operation unit 83 on its top face, with which a user can operate the projector 1. Further, the projector 1 has the focus lever 33 on its side face for adjusting the focus of image.

Figure 2:
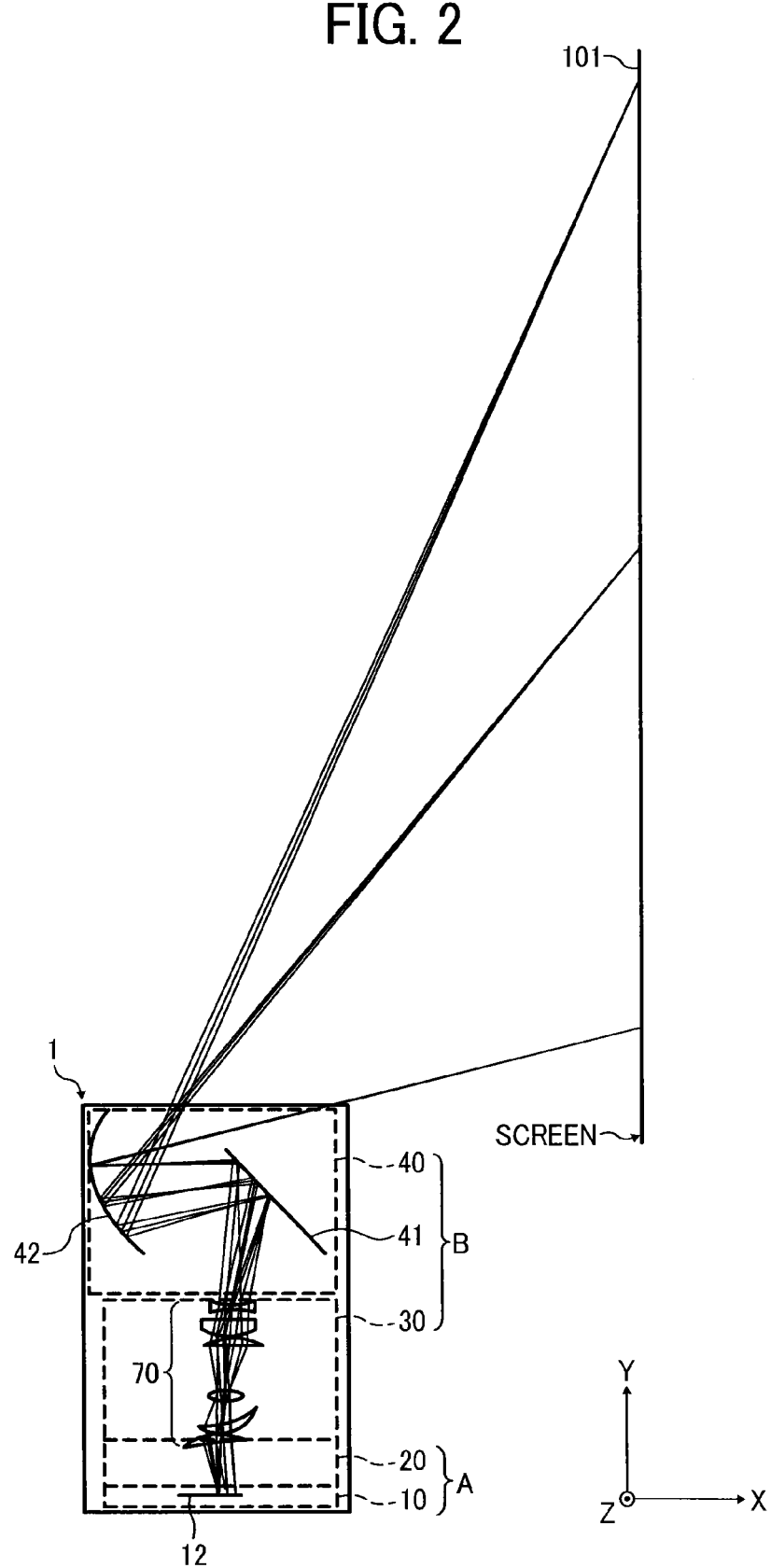
FIG. 2 shows a pattern of light paths from a projector to a projection plane.

FIG. 2 shows a pattern of light paths from the projector 1 to the projection plane 101. The projector 1 includes, for example, a light source unit having a light source, and an image generator A to generate images using the light emitted from the light source. The image generator A includes, for example, an image generation unit 10, and a lighting unit 20. The projector 1 further includes a projection optical system B. The image generation unit 10 includes an image generation element such as a digital mirror device (DMD) 12. The lighting unit 20 reflects and radiates light coming from the light source to the DMD 12 to generate a light image. The projection optical system B projects the light image on the projection plane 101. The projection optical system B includes a least one pass-through type reflection optical system. For example, the projection optical system B includes a first optical unit 30, and a second optical unit 40. The first optical unit 30 includes, for example, a first optical system 70 of co-axial system having the positive power. The second optical unit 40 includes, for example, a reflection mirror 41, and a curved mirror 42 having the positive power.

The DMD 12 can generate an image using the light emitted from the light source. Specifically, the light emitted from the light source irradiates the DMD 12 and an image is generated by modulating the light irradiated by the lighting unit 20. The image generated by the DMD 12 is projected onto the projection plane 101 via the first optical system 70 of the first optical unit 30, and the reflection mirror 41 and the curved mirror 42 of the second optical unit 40.

Figure 3:
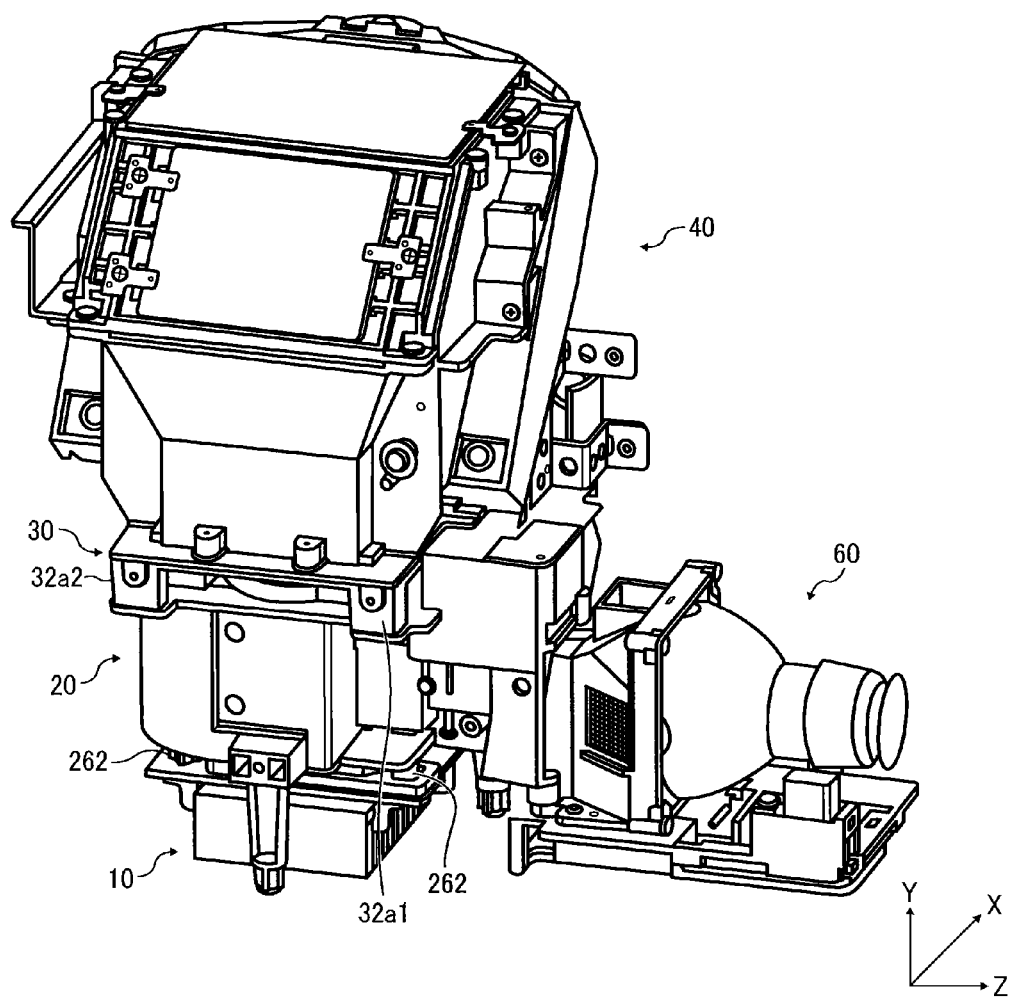
FIG. 3 shows a schematic perspective view of an internal configuration of the projector of FIG. 1.

FIG. 3 shows a schematic perspective view of an internal configuration of the projector 1. As shown in FIG. 3, the image generation unit 10, the lighting unit 20, the first optical unit 30, the second optical unit 40 are arranged along the Y direction in FIG. 3 parallel to the projection plane 101. Further, a light source unit 60 can be disposed at a right side of the lighting unit 20 in FIG. 3.

Further, as shown in FIG. 3, the first optical unit 30 has a lens holder 32 having legs 32a1 and 32a2, and the image generation unit 10 has screw stoppers 263 used to fix the image generation unit 10 to the lighting unit 20 using screws.

Figure 4:
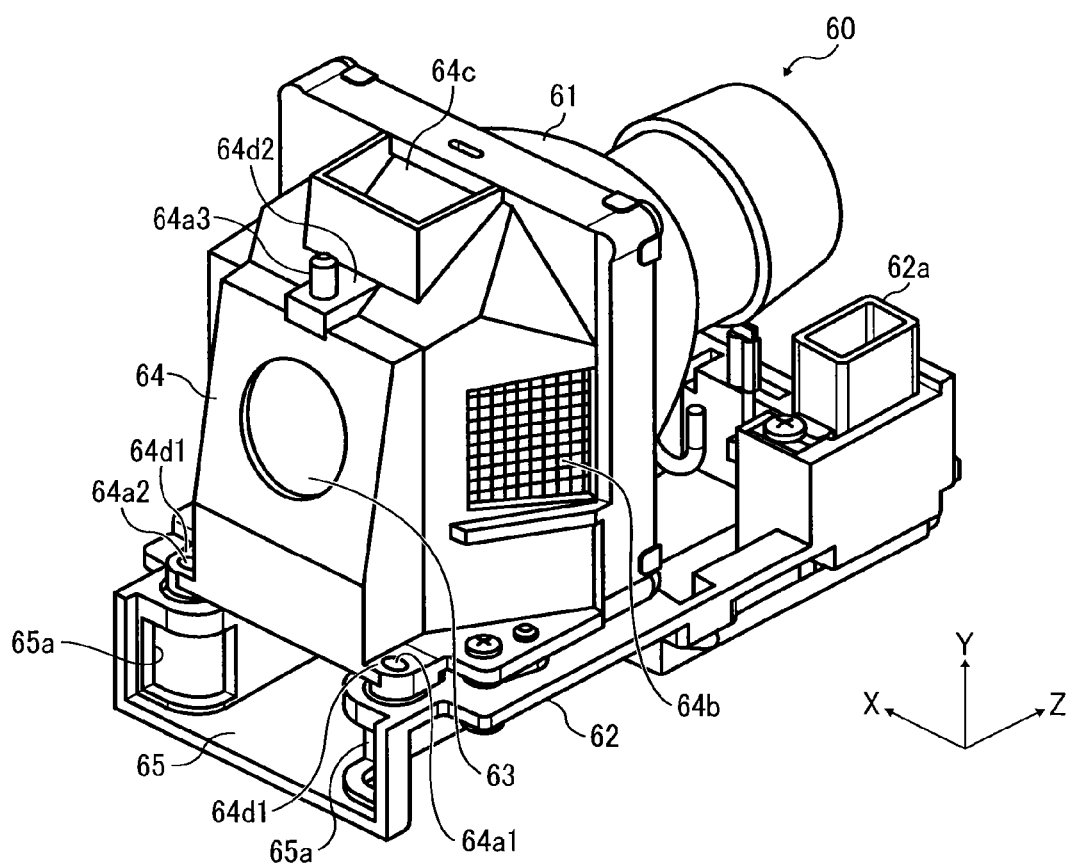
FIG. 4 shows a schematic perspective view of a light source unit.

A description is given of the configuration of each unit. Initially, the light source unit 60 is described. FIG. 4 shows a schematic perspective view of the light source unit 60. The light source unit 60 includes a light-source bracket 62, and a light source 61 fixed on the light-source bracket 62. The light source 61 is, for example, a halogen lamp, a metal-halide lamp, and a high-pressure mercury vapor lamp but not limited thereto. Further, the light-source bracket 62 has a connector 62a connectable to a power-source connector of a power source unit 80 (see FIG. 14).

Further, a holder 64 is fixed on the light exiting side of the light source 61 disposed on the light-source bracket 62 by using screws, wherein the holder 64 retains a reflector or the like. Further, a light-exit window 63 is disposed for the holder 64 while the light-exit window 63 is disposed at a side opposite the position of the light source 61. The light emitted from the light source 61 can be guided to the light-exit window 63 by the reflector retained in the holder 64, and exits from the light-exit window 63.

Figure 6:
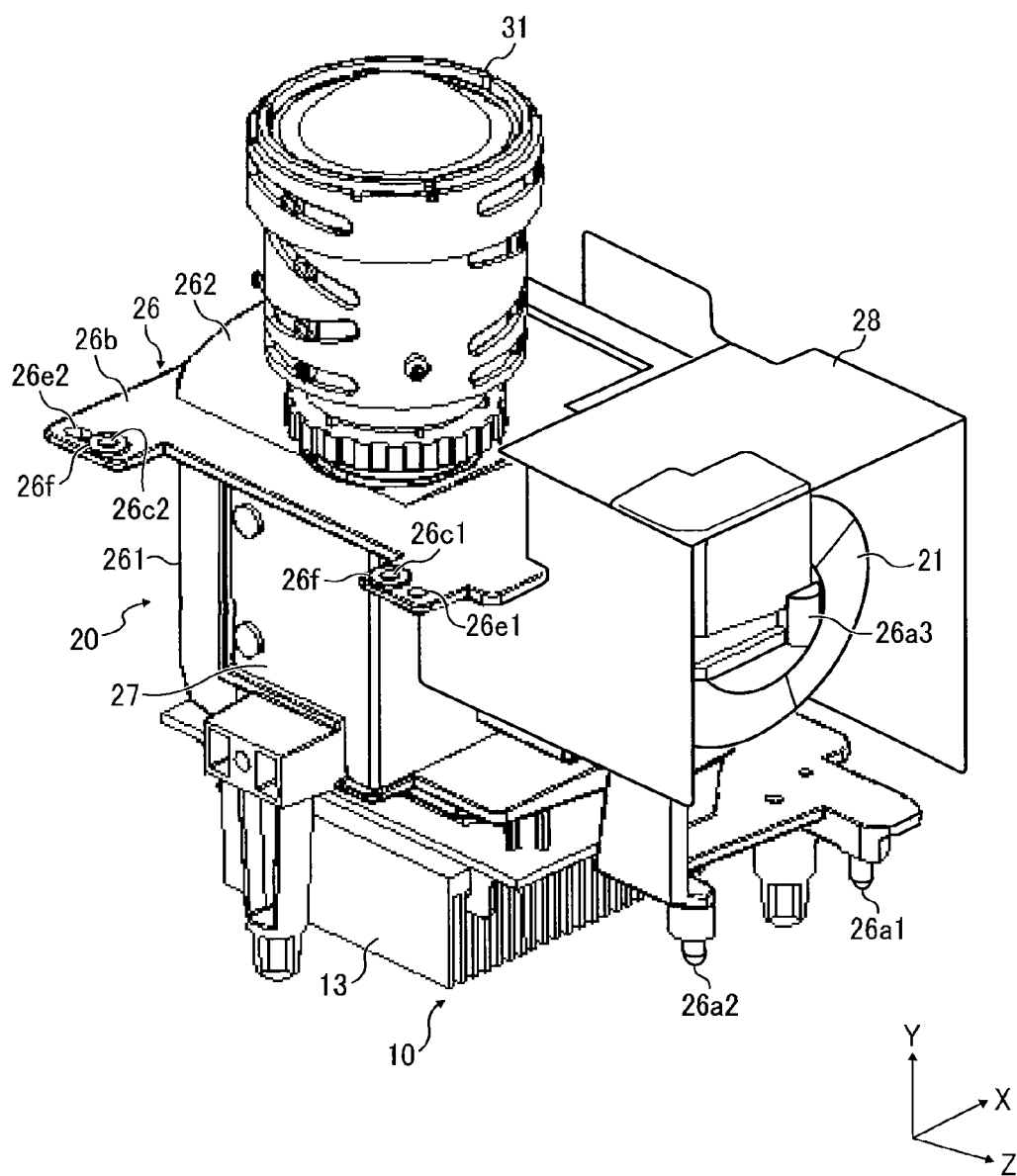
FIG. 6 shows a perspective view of an image generation unit, a lighting unit, and a projection lens unit viewed from the direction C shown in FIG. 5.

Further, light source position-setting members 64a1 to 64a3 are disposed at the top face of the holder 64 and both ends of the X direction of the bottom face of the holder 64 so that the light source unit 60 can be positioned correctly on a lighting unit bracket 26 of the lighting unit 20 (FIG. 6). For example, the light source position-setting member 64a3 disposed at the top face of the holder 64 has a protruded-shape, and the light source position-setting members 64a1 and 64a2 disposed at the bottom face of the holder 64 have a hole shape.

Further, a light-source air intake port 64b is disposed at a side face of the holder 64 to take in air used for cooling the light source 61, and a light-source air exhaust port 64c is disposed at the top face of the holder 64 to exhaust air heated by the heat of the light source 61.

Further, a pass-through area 65 is disposed for the light-source bracket 62 to take in air sucked in by an air-intake blower 91 to be described later.

Figure 5:
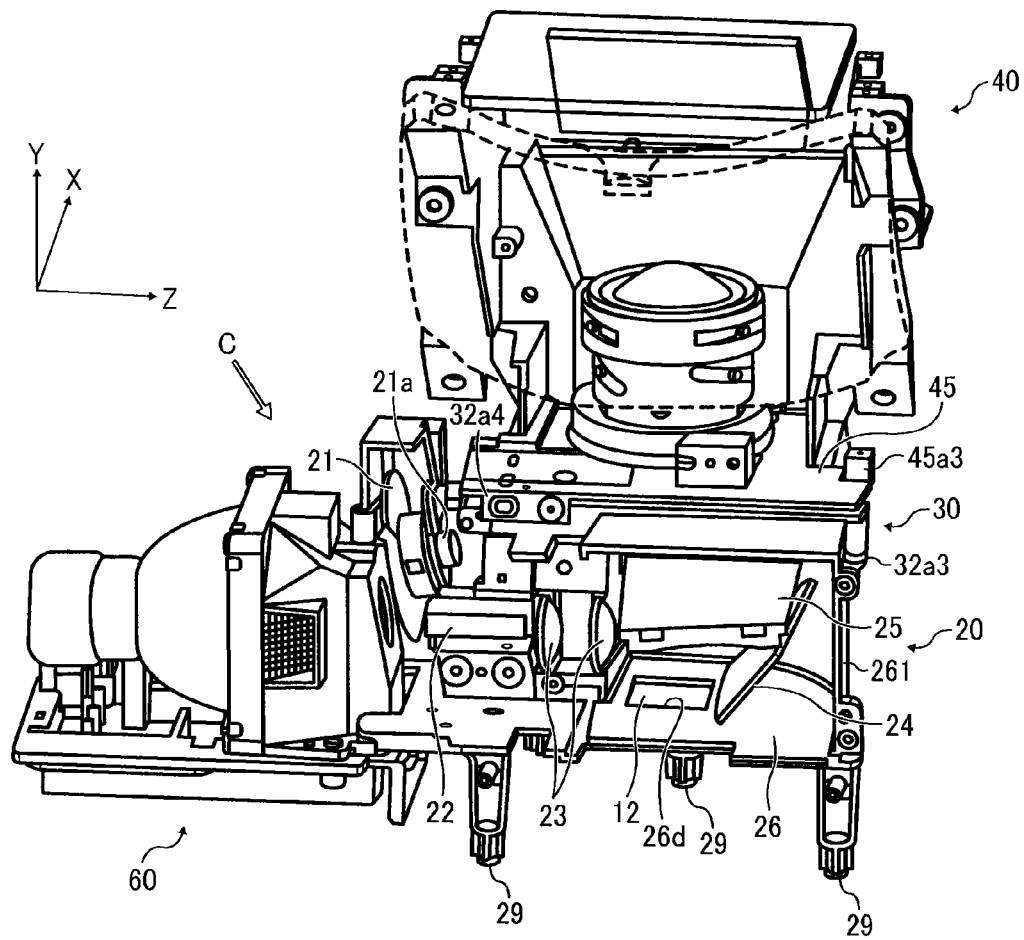
FIG. 5 shows a perspective view of optical parts encased in a lighting unit and other units.

A description is given of the lighting unit 20 with reference to FIG. 5, which shows a perspective view of optical parts encased in the lighting unit 20 and other units. As shown in FIG. 5, the lighting unit 20 includes, for example, a color wheel 21, a light tunnel 22, two relay lenses 23, a cylinder mirror 24, and a concave mirror 25, wherein such parts can be retained by the lighting unit bracket 26. The lighting unit bracket 26 includes, for example, a casing 261 that encases the relay lenses 23, the cylinder mirror 24, and the concave mirror 25. Among four sides of the casing 261, only one side has a side face (i.e., right side of FIG. 5), and other three sides are openings. Further, an OFF plate 27 (FIG. 6) is disposed at one opening-side of the X direction in FIG. 5, and a cover member is disposed at another opening-side of the X direction in FIG. 5. With this configuration, the relay lenses 23, the cylinder mirror 24, and the concave mirror 25 encased in the casing 261 of the lighting unit bracket 26 can be covered by the lighting unit bracket 26, the OFF plate 27 (FIG. 6), and the cover member.

Further, a through-hole 26d is disposed on the bottom face of the casing 261 of the lighting unit bracket 26 so that the DMD 12 can be exposed through the through-hole 26d.

Further, the lighting unit bracket 26 includes, for example, three legs 29. Such legs 29 can contact a base member 53 (FIG. 13) of the projector 1 to support the weight of the first optical unit 30 and the second optical unit 40 stacked and fixed on the lighting unit bracket 26. Further, by providing the legs 29, a space for taking in external air to a heat exchanger such as a heat sink 13 (FIG. 6) that cools the DMD 12 of the image generation unit 10, can be arranged, to be described later.

Further, as shown in FIG. 5, the lens holder 32 of the first optical unit 30 includes, for example, legs 32a3 and 32a4, and the second optical unit 40 includes, for example, a screw stopper 45a3.

FIG. 6 shows a perspective view of the image generation unit 10, the lighting unit 20, and a projection lens unit 31 viewed from the direction C shown in FIG. 5. The casing 261 of the lighting unit bracket 26 has a top face 26b extending in a direction perpendicular to the Y direction of FIG. 6. Through-holes are disposed at four corners of the top face 26b to fasten the first optical unit 30 with screws by inserting the screws into the through-holes. For example, FIG. 6 shows the through-holes 26c1 and 26c2. Further, as shown in FIG. 6, position-setting holes 26e1 and 26e2 are respectively disposed next to the through-holes 26c1 and 26c2 to set the first optical unit 30 at a correct position with the lighting unit 20.

As for such position-setting holes 26e1 and 26e2, the position-setting hole 26e1 disposed at the color wheel 21 side is used as a primary position-setting hole having a circular hole shape, and the position-setting hole 26e2 disposed at an opposite side of the color wheel 21 is used as a secondary position-setting hole having a slot hole extending in the Z direction.

Further, a position-setting protrusion 26f is disposed around each of the through-holes 26c1 and 26c2, wherein the position-setting protrusion 26f protrudes from the top face 26b of the lighting unit bracket 26. The position-setting protrusion 26f is used to set the first optical unit 30 at a correct position in the Y direction. If the precision of positioning is to be enhanced in the Y direction without providing the position-setting protrusion 26f, the flatness of the entire top face of the lighting unit bracket 26 is required to be enhanced, which is costly. By providing the position-setting protrusion 26f, the flatness is required to be enhanced only at the position-setting protrusion 26f. Therefore, the precision of positioning can be enhanced in the Y direction while reducing the cost.

Further, the top face of the lighting unit bracket 26 has an opening covered by a light shield plate 263 engaging the lower end of the projection lens unit 31, by which the intrusion of light from the upper side into the casing 261 can be prevented. Further, the light shield plate 263 is attached with a concave mirror 25 shown in FIG. 7.

Further, the top face 26b of the lighting unit bracket 26 has a cutout between the through-holes 26c1 and 26c2 of the top face 26b so that the second optical unit 40 can be screwed to the first optical unit 30 easily, to be described later.

A light source positioning member 26a3 is disposed at one end of the lighting unit bracket 26 at the color wheel 21 side (Z direction in FIG. 6). The light source positioning member 26a3 has a cylinder-like shape having a through-hole, to which the light source position-setting member 64a3 having the protruded-shape (FIG. 4), disposed at the top face of the holder 64 of the light source unit 60, engages. Further, two light source positioning members 26a1 and 26a2 having protruded-shape are disposed at a lower side of the light source positioning member 26a3, to which the light source position-setting member 64a1 and 64a2 disposed on the holder 64 at the light-source bracket 62 side, which are the through-holes, engage respectively. By respectively engaging the light source position-setting members 64a1 to 64a3 disposed for the holder 64 to the light source positioning members 26a1 to 26a3 disposed for the lighting unit bracket 26 of the lighting unit 20, the light source unit 60 can be fixed at the correct position of the lighting unit 20 (FIG. 3).

Further, the lighting unit bracket 26 includes a lighting unit cover 28 that covers the color wheel 21 and the light tunnel 22.

Figure 7:
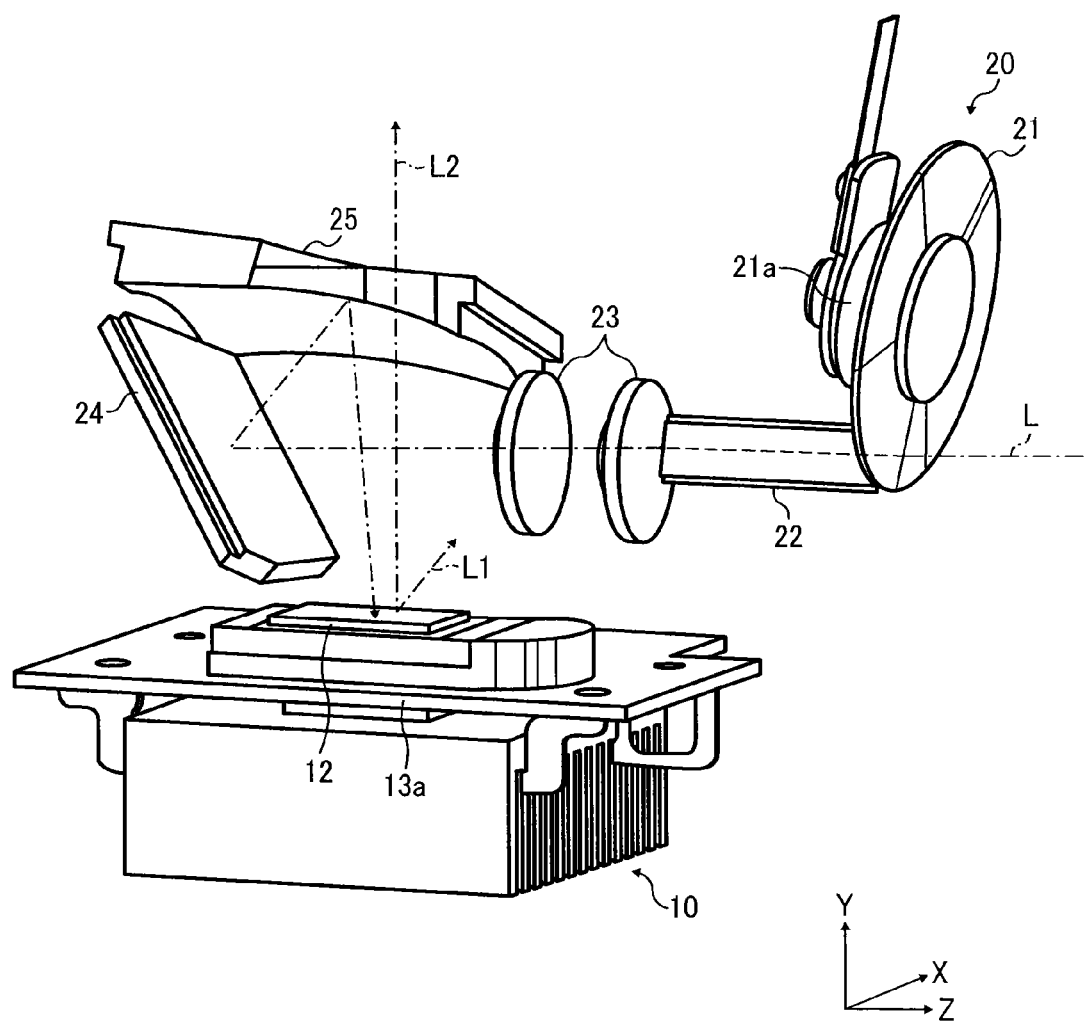
FIG. 7 shows a light path of light in the lighting unit.

FIG. 7 shows a light path L of light in the lighting unit 20. The color wheel 21 has a disc shape and is fixed on a motor shaft of a color motor 21a. The color wheel 21 includes, for example, R (red), G (green), and B (blue) filters along the rotation direction. The light focused by a reflector disposed for the holder 64 of the light source unit 60 passes through the light-exit window 63, and then reaches the peripheral area of the color wheel 21. The light that has reached the peripheral area of the color wheel 21 is separated into R, G and B lights along the timeline as the color wheel 21 rotates.

The lights separated by the color wheel 21 enter the light tunnel 22. The light tunnel 22 is a tube-shaped member having a square-like cross shape, and its internal face is finished as a mirror face. The light entered the light tunnel 22 reflects a plurality of times on the internal face of the light tunnel 22, and is then emitted as uniform light to the relay lenses 23.

The light that has passed the light tunnel 22 passes the two relay lenses 23, reflects on the cylinder mirror 24 and the concave mirror 25, and is then focused on an image generation face of the DMD 12 as an image.

Figure 8:
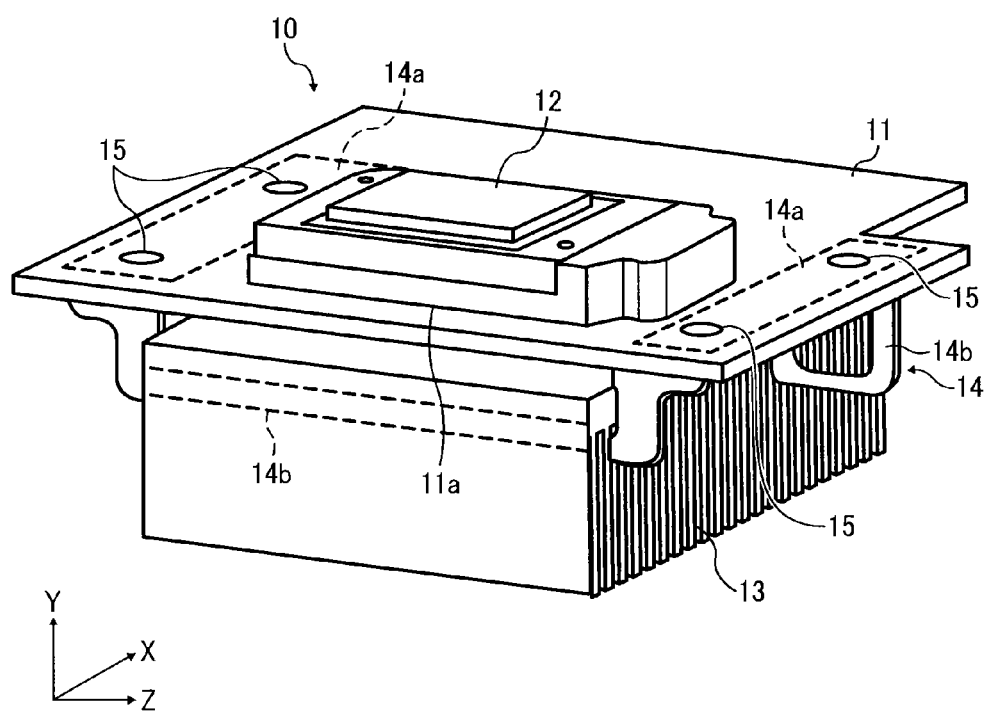
FIG. 8 shows a perspective view of the image generation unit of FIG. 7.

A description is given of the image generation unit 10 with reference to FIG. 8, which shows a perspective view of the image generation unit 10. As shown in FIG. 8, the image generation unit 10 includes, for example, a DMD board 11 to which the DMD 12 is attached. The DMD 12 is attached to a socket 11a disposed on the DMD board 11 while orienting an image generation face composed of micro mirrors arranged in a lattice pattern to an upward direction. The DMD board 11 includes a drive circuit to drive micro mirrors.

A heat exchanger such as the heat sink 13 is fixed on a distal side of the DMD board 11 (i.e., a face opposite a face having the socket 11a) to cool the DMD 12. The DMD board 11 has a through-hole area to which the DMD 12 is attached, and the heat sink 13 has a protruded portion 13a (FIG. 7) insertable into the through-hole area. The protruded portion 13a has an edge portion having a flat shape. By inserting the protruded portion 13a into the through-hole area, the flat edge portion of the protruded portion 13a can contact the distal side of the DMD 12 (i.e., face opposite the image generation face). An elastic and flexible heat conduction sheet can be attached on the flat edge portion of the protruded portion 13a and/or an area of the distal side of the DMD 12 so that the heat sink 13 and the distal side of the DMD 12 can be closely contacted to enhance thermal conductivity.

The heat sink 13 can be fixed on a face opposite a face disposed of the socket 11a of the DMD board 11 by applying pressure using a fixing device 14. The fixing device 14 includes, for example, a plate-like fixing part 14a at a right distal side of the DMD board 11 (right side in FIG. 8), and a plate-like fixing part 14a at a left distal side of the DMD board 11 (left side in FIG. 8) disposed at as counterpart members with each other. As shown in FIG. 8, one end and other end of the plate-like fixing parts 14a are linked by a pressure member 14b extending in the Z direction in FIG. 8.

When the image generation unit 10 is fixed to the lighting unit bracket 26 (FIG. 6) using screws, the heat sink 13 is pressed and fixed to the face opposite the face disposed of the socket 11a of the DMD board 11 by applying force from the fixing device 14.

A description is given of fixing of the lighting unit bracket 26 of the image generation unit 10. Initially, the image generation unit 10 is positioned with respect to the lighting unit bracket 26 so that the DMD 12 can face the through-hole 26d disposed on the bottom face of the lighting unit bracket 26 of the lighting unit 20 (FIG. 5). Then, a screw is inserted into each of through-holes disposed for the fixing part 14a, and each of through-holes 15 disposed for the DMD board 11 from a lower side, and the screw is screwed into each of screw holes disposed at the bottom face of the screw stopper 262 (FIG. 3) of the lighting unit bracket 26 to fix the image generation unit 10 to the lighting unit bracket 26. Further, as the screw is screwed into the screw stopper 262 disposed for the lighting unit bracket 26, the pressure member 14b presses the heat sink 13 toward the DMD board 11. With this configuration, the heat sink 13 can be pressed and fixed on the face opposite the face disposed with the socket 11a of the DMD board 11 by using the fixing device 14.

As described above, the image generation unit 10 can be fixed to the lighting unit bracket 26, and the three legs 29 shown in FIG. 5 can support the weight of the image generation unit 10.

The image generation face of the DMD 12 is composed of a plurality of movable micro mirrors arranged in a lattice pattern. Each of micro mirrors can incline the mirror face about a torsion shaft for a given angle, and can be set with two conditions of "ON" and "OFF". When the micro mirror is set "ON", the light coming from the light source 61 is reflected toward the first optical system 70 (FIG. 2) as shown by an arrow L2 shown in FIG. 7. When the micro mirror is set "OFF", the light coming from the light source 61 is reflected toward the OFF plate 27, retained on the side face of the lighting unit bracket 26 shown in FIG. 6, as shown by an arrow L1 shown in FIG. 7. Therefore, by driving each mirror independently, the light projection can be controlled for each pixel of image data to generate an image.

The light reflected to the OFF plate 27 is absorbed as heat and then the OFF plate 27 is cooled by the airflow flowing outside the OFF plate 27.

Figure 9:
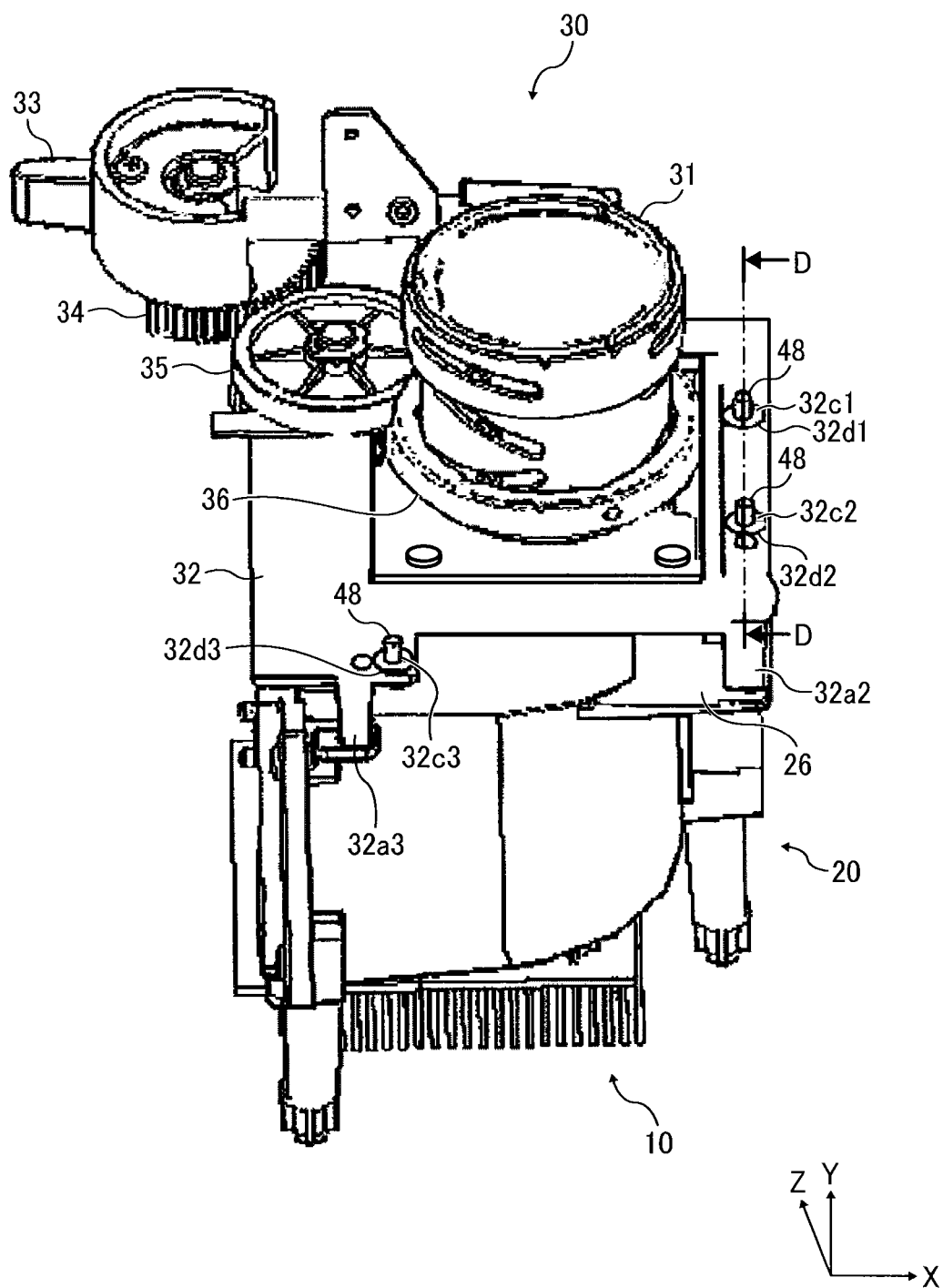
FIG. 9 shows a perspective view of a first optical unit with the lighting unit and the image generation unit.

A description is given of the first optical unit 30 with reference to FIG. 9, which shows a perspective view of the first optical unit 30 with the lighting unit 20 and the image generation unit 10. As shown in FIG. 9, the first optical unit 30 is disposed over the lighting unit 20, and includes, for example, the projection lens unit 31, and the lens holder 32. The projection lens unit 31 retains the first optical system 70 (FIG. 2) composed of a plurality of lenses, and the lens holder 32 retains the projection lens unit 31. The lens holder 32 is disposed with four legs 32a1 to 32a4 extending toward the downside, wherein FIG. 9 shows the legs 32a2 and 32a3. The leg 32a1 is shown in FIG. 3, and the leg 32a4 is shown in FIG. 5. Each of the legs 32a1 to 32a4 is formed of a screw hole on its bottom face to be used when fixed with the lighting unit bracket 26 using a screw.

Further, the projection lens unit 31 is disposed with a focus gear 36 meshed with an idler gear 35. The idler gear 35 is meshed with a lever gear 34, and the focus lever 33 is fixed to a rotation shaft of the lever gear 34. As shown in FIG. 1, the end of the focus lever 33 is projected outside the projector 1.

When the focus lever 33 is operated, the focus gear 36 is rotated via the lever gear 34 and the idler gear 35. When the focus gear 36 is rotated, each of the plurality of lenses composing the first optical system 70 disposed in the projection lens unit 31 can be moved to a given direction to adjust a focal point of a projection image.

Further, the lens holder 32 includes, for example, four threaded through-holes so that the second optical unit 40 can be fixed with the first optical unit 30 using screws, in which a screw 48 is screwed into each of the threaded through-holes 32c1 to 32c3. FIG. 9 shows three threaded through-holes 32c1 to 32c3, and the screw 48 is inserted into each of the threaded through-holes 32c1 to 32c3. In FIG. 9, the end of the screw 48 is shown. Further, positioning protruded members 32d1 to 32d3 are respectively formed around each of the threaded through-holes 32c1 to 32c3, in which each of the positioning protruded members 32d1 to 32d3 protrudes from the face of the lens holder 32. FIG. 9 shows the positioning protruded members 32d1 to 32d3.

Figure 10:
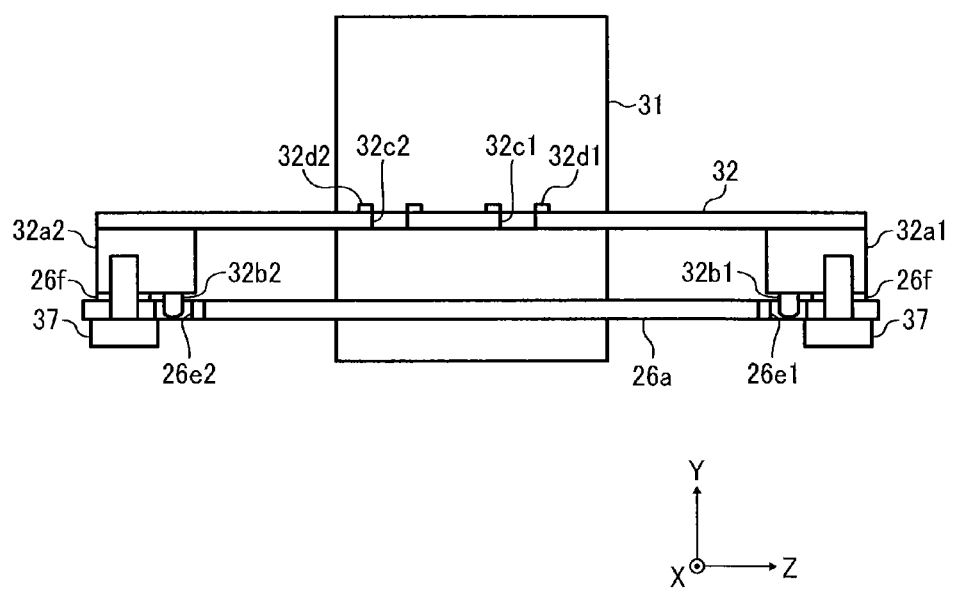
FIG. 10 shows a cross-sectional view along a line D-D of FIG. 9.

FIG. 10 shows a cross-sectional view along a line D-D of FIG. 9. As shown in FIG. 10, each of the legs 32a1 and 32a2 is disposed with positioning protruded members 32b1 and 32b2, respectively. The positioning protruded member 32b1 (right side in FIG. 10) is inserted in the position-setting hole 26e1 having the circular hole shape, which is the primary position-setting hole disposed on the top face 26b of the lighting unit bracket 26. The positioning protruded member 32b2 (left side in FIG. 10) is inserted in the position-setting hole 26e2 having the slot hole shape, which is the secondary position-setting hole. With this configuration, the position in the Z direction and X direction can be set correctly.

Further, a screw 37 is inserted into each of the through-holes 26c1 to 26c4 disposed for the top face 26b of the lighting unit bracket 26, and then screwed into screw holes of each of the legs 32a1 to 32a4 of the lens holder 32, by which the first optical unit 30 can be fixed to the lighting unit 20 with a correct position.

The second optical unit 40 includes a mirror holder 45 (see FIG. 12) that covers a portion of the projection lens unit 31 above the lens holder 32 to be described later. Further, as shown in FIG. 3, a space between a part of the lens holder 32, lower than a part of the lens holder 32 corresponding to the projection lens unit 31 and the top face 26b of the lighting unit bracket 26 of the lighting unit 20 is exposed outside. However, because the projection lens unit 31 engages the lens holder 32, the light does not enter the light path of projection light from such exposed part.

Figure 11:
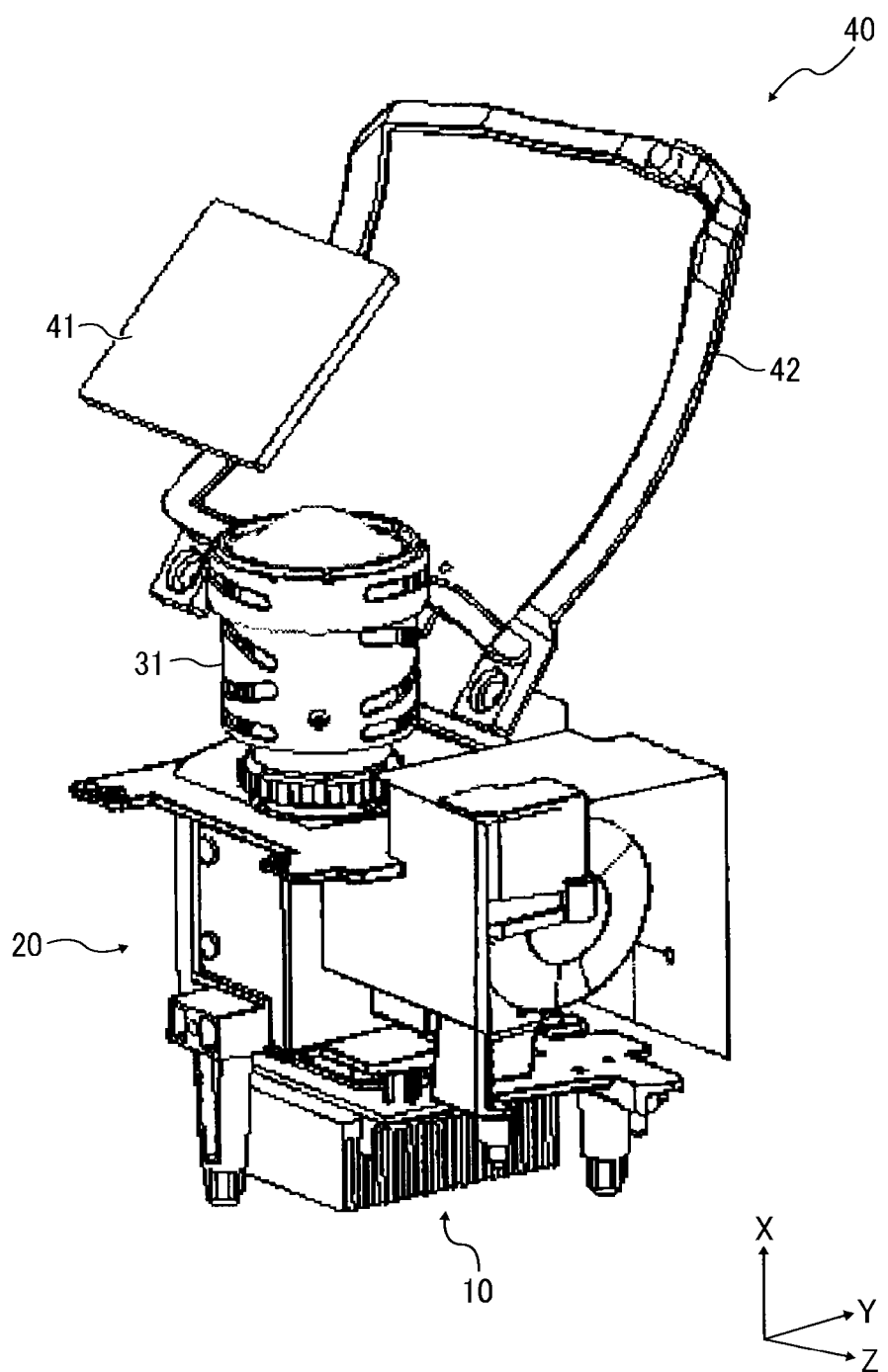
FIG. 11 shows a perspective view of a second optical unit configured with a projection lens unit, the lighting unit, and the image generation unit.
Figure 12:
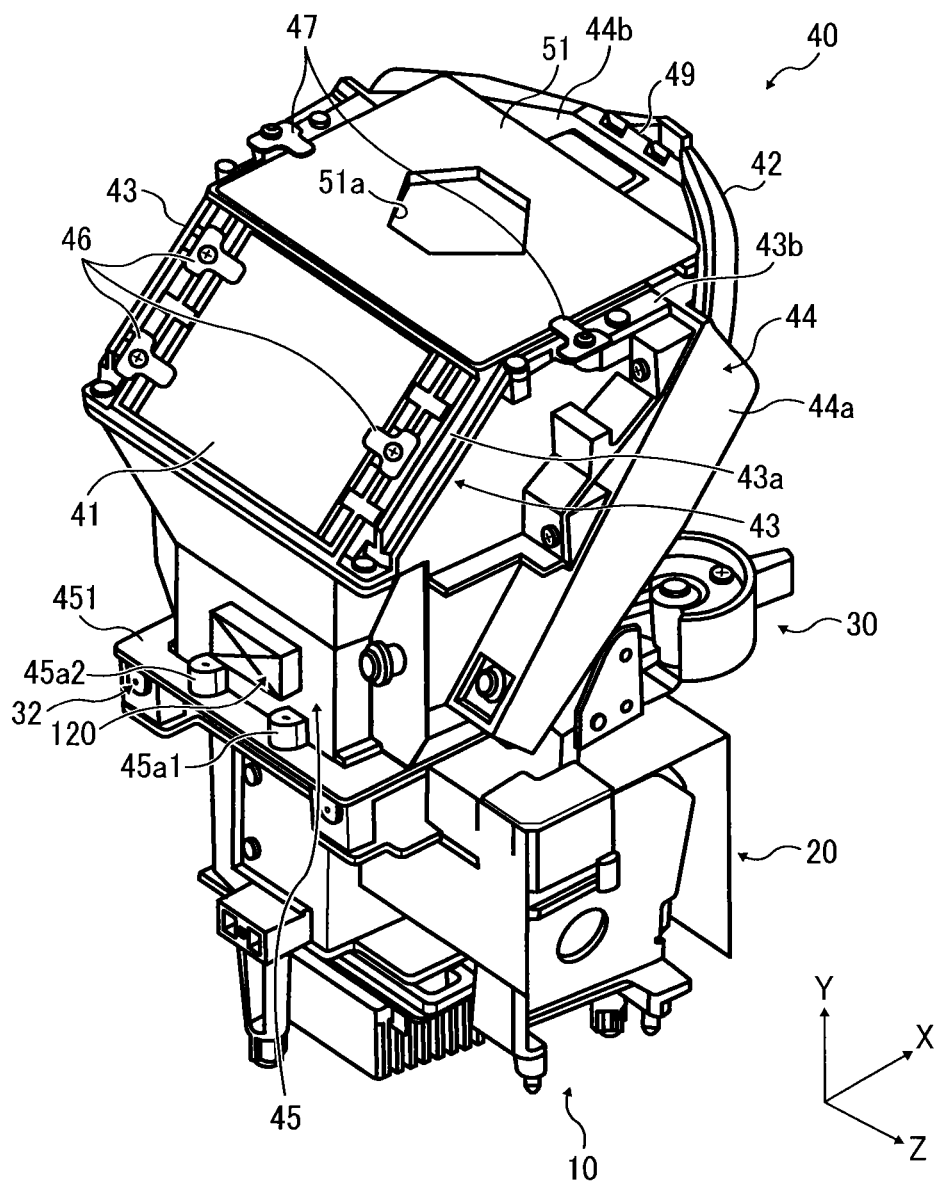
FIG. 12 shows a perspective view of the second optical unit configured with a first optical unit, the lighting unit, and the image generation unit.

A description is given of the second optical unit 40 with reference to FIGS. 11 and 12. FIG. 11 shows a perspective view of the second optical unit 40 used as a second optical system configured with the projection lens unit 31, the lighting unit 20, and the image generation unit 10. As shown in FIG. 11, the second optical unit 40 includes, for example, the reflection mirror 41, and the curved mirror 42 having the concave shape. The reflection face of the curved mirror 42 can be finished as a circular face, a rotation symmetrical non-circular face, a free curve shape, or the like.

FIG. 12 shows a perspective view of the second optical unit 40 with the first optical unit 30, the lighting unit 20, and the image generation unit 10. As shown in FIG. 12, the second optical unit 40 includes a top plate 51 and a positive pressure fan 120. The top plate 51 is formed with a window 51a to pass through light image reflected from the curved mirror 42, and the positive pressure fan 120 is used as an air supply unit to supply air into the second optical unit 40. The window 51a can be formed on the top plate 51 as an opening or a through hole.

The second optical unit 40 includes, for example, a mirror bracket 43, a free mirror bracket 44, and a mirror holder 45. The mirror bracket 43 retains the reflection mirror 41 and the top plate 51. The free mirror bracket 44 retains the curved mirror 42. The mirror holder 45 holds the mirror bracket 43, the free mirror bracket 44, and the positive pressure fan 120.

The mirror holder 45 has a box-like shape while the upper side, lower side, and one side such as right side in the X direction in FIG. 12 are opened, and thereby the mirror holder 45 has a U-like shape when viewed from the top. The upper part of the mirror holder 45 includes an inclined portion extending along a direction set between the middle of the X and Y directions by increasing the height, and includes a parallel face parallel to the X direction. The inclined portion is disposed at a proximal side of the parallel face in the X direction. Further, the peripheral side of upper opening of the mirror holder 45 disposed at a proximal side in the X direction and extending in the Z direction is parallel to the Z direction in FIG. 12.

The mirror bracket 43 is attached to the upper part of the mirror holder 45. The mirror bracket 43 includes an inclined side 43a and a horizontal side 43b. The inclined side 43a rises along a direction set between the middle of the X and Y directions by increasing the height as shown in FIG. 12. The horizontal side 43b extends in a direction parallel to the X direction in FIG. 12. The inclined side 43a contacts the peripherals of the inclined portion of the mirror holder 45, and the horizontal side 43b contacts the peripherals of the horizontal part of the mirror holder 45, which is the top of the mirror holder 45. The inclined side 43a includes an opening, and the reflection mirror 41 is retained to cover the opening of the inclined side 43a. The horizontal side 43b includes an opening, and the top plate 51 is retained to cover the opening of the horizontal side 43b.

Each end of the reflection mirror 41 in the Z direction is pressed to the inclined side 43a of the mirror bracket 43 by the mirror pressing member 46 such as a leaf spring to hold the reflection mirror 41 at the inclined side 43a of the mirror bracket 43. For example, as shown in FIG. 12, one end of the reflection mirror 41 in the Z direction is fixed by the two mirror pressing members 46, and other end of the reflection mirror 41 in the Z direction is fixed by the one mirror pressing member 46.

Each end of the top plate 51 in the Z direction is pressed to the horizontal side 43b of the mirror bracket 43 by a top plate pressing member 47 such as a leaf spring to hold the top plate 51 on the mirror bracket 43. Each end of the top plate 51 in the Z direction is retained by using one top plate pressing member 47 at each end in the Z direction.

The free mirror bracket 44 to retain the curved mirror 42 includes an arm portion 44a at each side of the free mirror bracket 44, in which the arm portion 44a extends and inclines along a direction set between the middle of the X and Y directions as shown in FIG. 12. Further, the free mirror bracket 44 includes a link portion 44b that links such two arm portions 44a at the upper portion of the arm portions 44a. The arm portion 44a of the free mirror bracket 44 is attached to the mirror holder 45 so that the curved mirror 42 covers an opening of the mirror holder 45.

The curved mirror 42 is pressed toward the link portion 44b of the free mirror bracket 44 by a free mirror pressing member 49 such as a leaf spring at a substantially center of one end side of the top plate 51. Further, each end side of the first optical system 70 in the Z direction in FIG. 12 is fixed to the arm portion 44a of the free mirror bracket 44 using a screw.

The positive pressure fan 120 is disposed at a position covering an inflow port 453 (see FIG. 15) formed on the mirror holder 45. The positive pressure fan 120 supplies airflow into a space of the second optical unit 40 encircled by the mirror bracket 43, the free mirror bracket 44, and the mirror holder 45. The air supplied into the space is exhausted from the window 51a of the top plate 51. An airflow in the space of the second optical unit 40 will be described later.

The second optical unit 40 is stacked and fixed on the lens holder 32 of the first optical unit 30. Specifically, the bottom side of the mirror holder 45 has a bottom face 451 that faces an upper face of the lens holder 32. The bottom face 451 has three screw stoppers 45a1 to 45a3 having tube-like shape, which can be fixed with the first optical unit 30 by screws. FIG. 12 shows the screw stoppers 45a1 and 45a2, and FIG. 5 shows the screw stopper 45a3. the second optical unit 40 is fixed to the first optical unit 30 using screws, in which the screw 48 is inserted into each of the threaded through-holes 32c1 to 32c3 provided for the lens holder 32 of the first optical unit 30, and screwed into each of the screw stoppers 45a1 to 45a3 to fix the second optical unit 40 to the first optical unit 30. In such a configuration, the bottom face of the mirror holder 45 of the second optical unit 40 contacts the positioning protruded members 32d1 to 32d3 of the lens holder 32, by which the second optical unit 40 can be fixed at a correct position in the Y direction.

As shown in FIG. 12, when the second optical unit 40 is stacked and fixed on the lens holder 32 of the first optical unit 30, a portion of the projection lens unit 31 that is above the lens holder 32 is encased in the mirror holder 45 of the second optical unit 40. Further, when the second optical unit 40 is stacked and fixed on the lens holder 32, a space is set between the curved mirror 42 and the lens holder 32, and the idler gear 35 (FIG. 9) may be set in such space.

Figure 13:
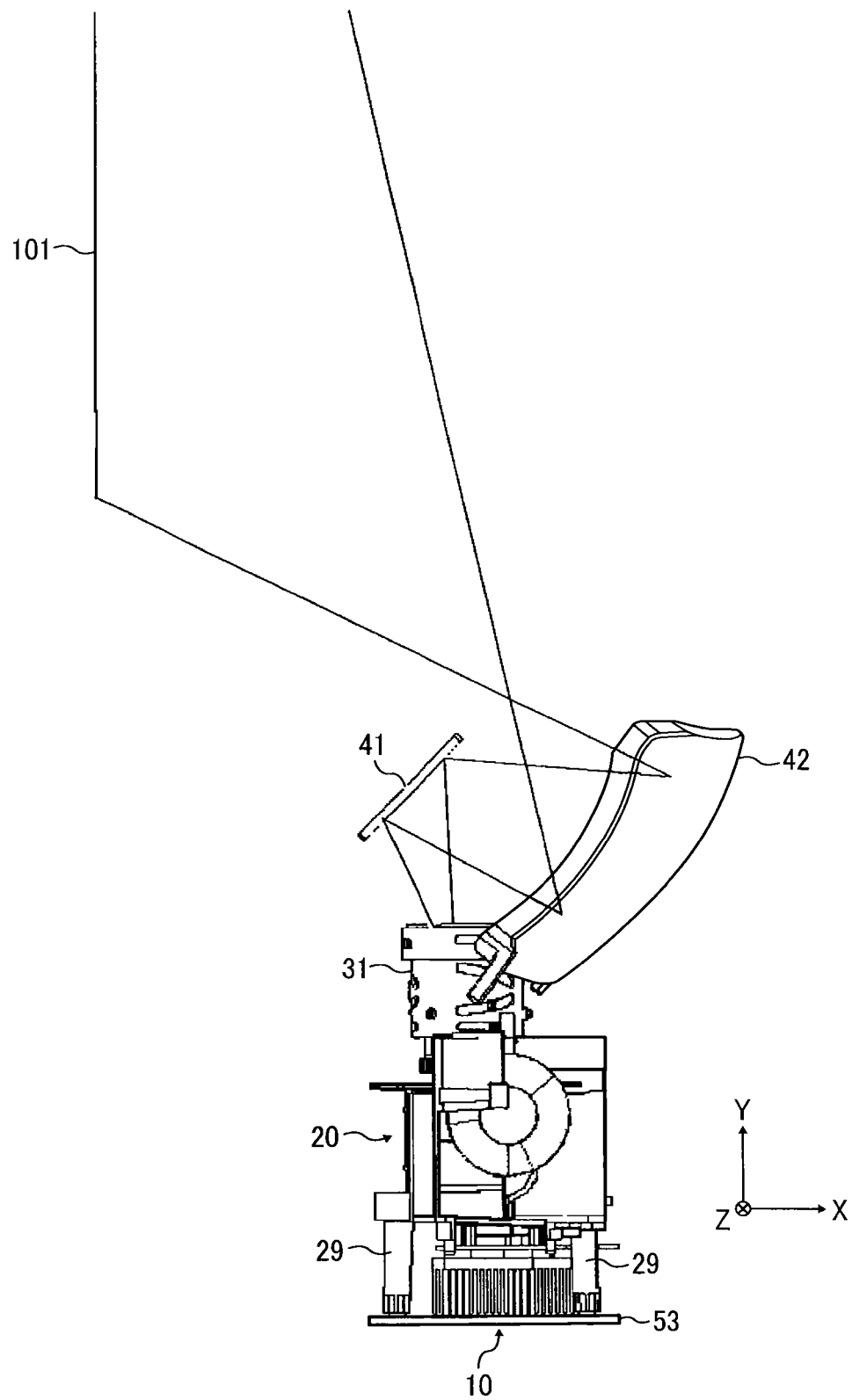
FIG. 13 shows a schematic view of a light path from a first optical system to a projection plane.

FIG. 13 shows a schematic view of the light path from the first optical system 70 to the projection plane 101 such as a screen. The light flux that has passed through the projection lens unit 31 configuring the first optical system 70 is used to generate an intermediate image between the reflection mirror 41 and the curved mirror 42, which is a conjugate image with respect to an image generated by the DMD 12. Such intermediate image is generated as a curved image between the reflection mirror 41 and the curved mirror 42. Such intermediate image enters the curved mirror 42 having a concave shape, and the curved mirror 42 enlarges the intermediate image and projects the enlarged image onto the projection plane 101.

As described above, an optical projection system can be configured with the first optical system 70, and the second optical system. In such a configuration, the intermediate image is generated between the first optical system 70 and the curved mirror 42 of the second optical system, and the intermediate image is enlarged and projected by the curved mirror 42, by which the projection distance to the screen can be set shorter. Therefore, the projector 1 can be used in small meeting rooms or the like.

Further, as shown in FIG. 13, the first optical unit 30 and the second optical unit 40 are stacked and fixed to the lighting unit bracket 26. Further, the image generation unit 10 is fixed to the lighting unit bracket 26. Therefore, the legs 29 of the lighting unit bracket 26 can be fixed to the base member 53 while supporting the weight of the first optical unit 30, the second optical unit 40, and the image generation unit 10.

Figure 14:
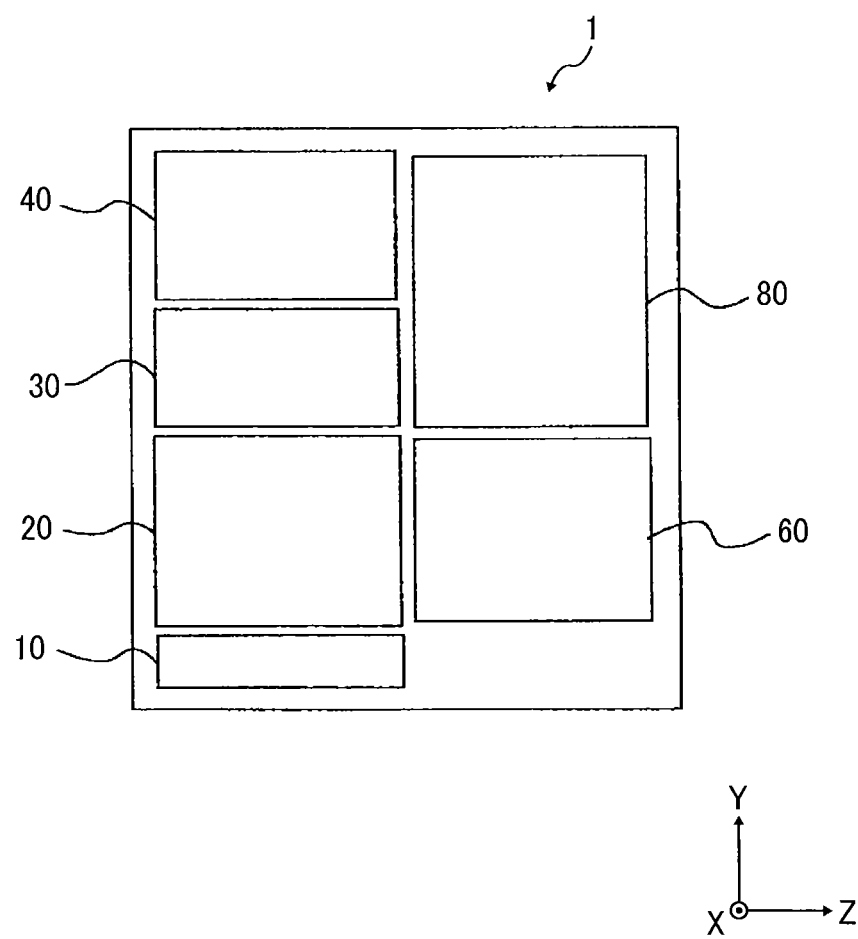
FIG. 14 schematically shows a layout of units in the projector.

FIG. 14 schematically shows a layout of units in the projector 1. As shown in FIG. 14, the image generation unit 10, the lighting unit 20, the first optical unit 30, and the second optical unit 40 are stacked along the Y direction, which is the short side direction of the projection plane 101. As shown in FIG. 14, the light source unit 60 is arranged in the Z direction with respect to other stacked units composed of the image generation unit 10, the lighting unit 20, the first optical unit 30, and the second optical unit 40, which is the long side direction of the projection plane 101. As described above, in an example embodiment, the image generation unit 10, the lighting unit 20, the first optical unit 30, the second optical unit 40, and the light source unit 60 can be arranged along the Y direction and Z directions, which are parallel to a projection image and the projection plane 101.

Specifically, the projection optical system B having the first optical unit 30 and the second optical unit 40 is stacked on the image generator A having the image generation unit 10 and the lighting unit 20. The light source unit 60 is coupled to the image generator A in a direction perpendicular to the stacking direction of the image generator A and the projection optical system B. Further, the image generator A and the light source unit 60 can be arranged along a direction parallel to the base member 53. Further, the image generator A and the projection optical system B may be arranged along a direction perpendicular to the base member 53, in which the image generator A is disposed over the base member 53, and then the projection optical system B is disposed over the image generator A. Therefore, the length of the projector 1 in the direction perpendicular to the projection plane 101 (i.e., X direction in FIG. 14) can be set shorter. With this configuration, the projector 1 may not cause problems when arranging a space for chairs and desks in small rooms, by which the projector 1 having a good enough level of convenience can be devised.

Further, as shown in FIG. 14, a power source unit 80 is stacked or disposed above the light source unit 60, wherein the power source unit 80 supplies power to the light source 61 and the DMD board 11 of the DMD 12. The light source unit 60, the power source unit 80, the image generator A, and the projection optical system B are encased in a casing of the projector 1. The casing of the projector 1 includes the top face of the projector 1, the base member 53, and an outer cover used as the side face of the projector 1.

A description is given of configuration of the projector 1 according to an example embodiment. A light path of an projection image is enclosed by the second optical unit 40 having the mirror bracket 43, the free mirror bracket 44, the mirror holder 45, the reflection mirror 41, the curved mirror 42, and the top plate 51. Therefore, the mirror bracket 43, the free mirror bracket 44, the mirror holder 45, the reflection mirror 41, the curved mirror 42, and the top plate 51 can be collectively used as an enclosing unit. For the simplicity of expression, the second optical unit 40 having the mirror bracket 43, the free mirror bracket 44, the mirror holder 45, the reflection mirror 41, the curved mirror 42, and the top plate 51 is referred to the enclosing unit as required.

The projection image P is projected onto the projection plane 101 by passing the window 51a of the top plate 51 from a space in the second optical unit 40, enclosed by the above mentioned members 43, 44, 45, 41, 42, and 51.

Therefore, as to an example embodiment, dust may intrude into the second optical unit 40 through the window 51a that the projection image passes. The dust intruded in the second optical unit 40 may adhere on the curved mirror 42, the reflection mirror 41 and so on, with which quality of the projection image projected onto the projection plane 101 may deteriorate.

In view of such problem, a transparent glass can be disposed to cover the window 51a. However, the transparent glass will increase the apparatus cost. Further, the transparent glass may affect the light intensity. As shown in FIG. 2, the projection image is projected from the top face of the projector 1 with acute angles. Therefore, a distance of the projection image passing in the transparent glass becomes longer. Therefore, transmittance of the projection image projected onto the projection plane 101 decreases when passing the transparent glass, with which decrease of light intensity on the screen becomes greater. Further, dust intrudes into the second optical unit 40 from a small gap between the free mirror bracket 44 and the mirror holder 45, and it becomes difficult to remove if dust adheres on the curved mirror 42, the reflection mirror 41 and so on.

Therefore, as to an example embodiment, the positive pressure fan 120 supplies air into the second optical unit 40 to maintain the pressure in the second optical unit 40 at positive pressure during an image projection operation to suppress, in particular prevent the dust intrusion from the window 51a.

Figure 15:
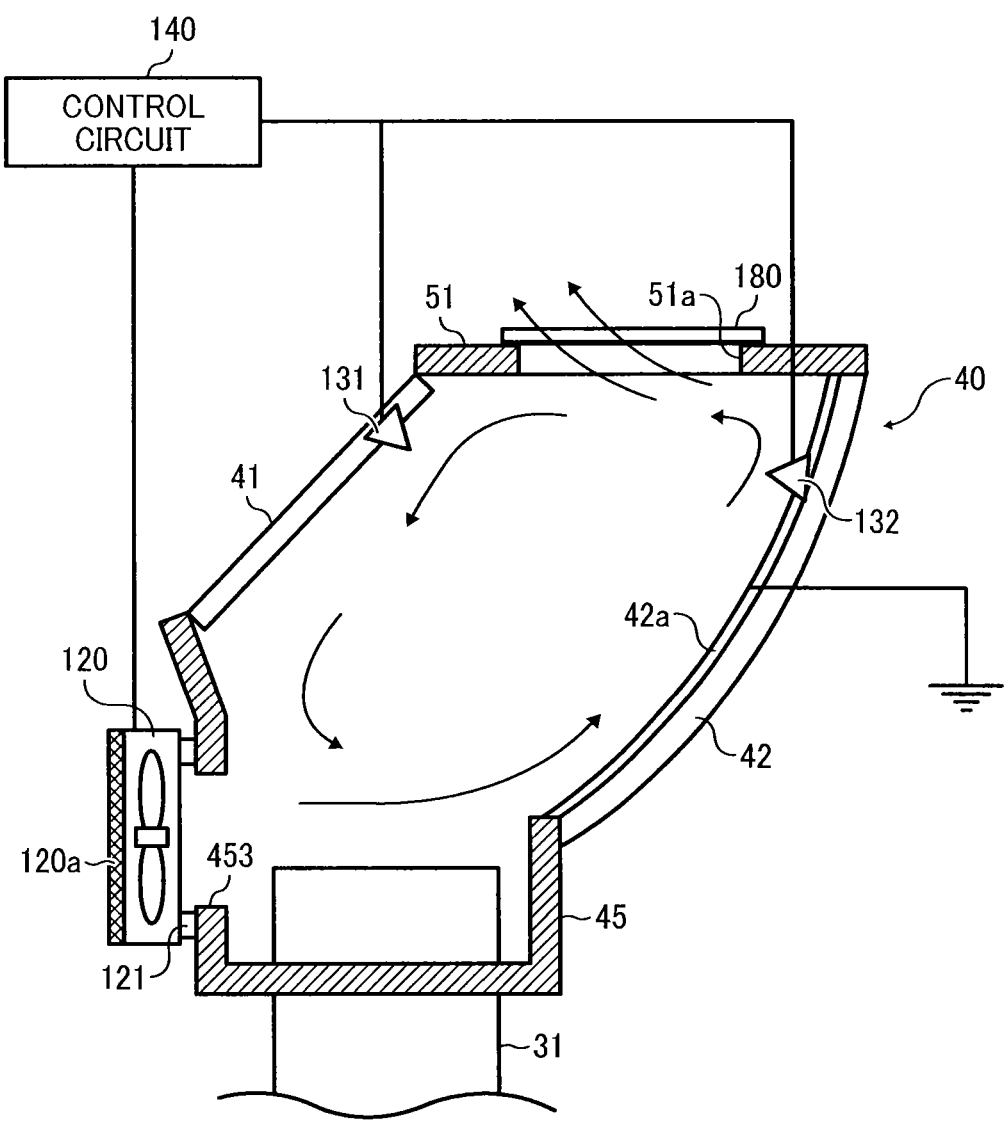
FIG. 15 is a schematic internal configuration of a second optical unit.

FIG. 15 is a schematic configuration of the second optical unit 40. As shown in FIG. 15, the positive pressure fan 120 can be disposed at a position covering the inflow port 453 formed on a side of the mirror holder 45. Specifically, the positive pressure fan 120 is attached to the mirror holder 45 via a pad 121 having cushioning characteristics such as sponge. With this configuration, transmittance of vibration of the positive pressure fan 120 during a rotation of the positive pressure fan 120 to the second optical unit 40 can be reduced, and vibration of the projection image projected onto the projection plane can be reduced.

Further, the positive pressure fan 120 is attached to the mirror holder 45 by setting a discharge face of the positive pressure fan 120 at a position angled 90 degrees with respect to an opening face of the window 51a. Further, the positive pressure fan 120 may be an axial flow fan, which may be less expensive.

Further, a dust remover such as a dust-proof filter 120a is disposed on an air-intake face of the positive pressure fan 120. With this configuration, air can be supplied into the second optical unit 40 without dust Further, an atmospheric pressure sensor 131 is disposed at the window 51a side of the reflection mirror 41, and an atmospheric pressure sensor 132 is disposed at the window 51a side of the curved mirror 42. The atmospheric pressure sensors 131 and 132 are connected to a control circuit 140.

Based on a detection result of the atmospheric pressure sensors 131 and 132, the control circuit 140 controls rotation numbers of the positive pressure fan 120 to set positive pressure in the second optical unit 40.

Further, a shutter 180 is disposed on the top plate 51 to open and close the window 51*a*. The shutter 180 is slide-ably disposed on the top plate 51 using known drive mechanisms such as rack-and-pinion. When the positive pressure fan 120 is stopped its rotation, and positive pressure condition is not maintained in the second optical unit 40, the window 51*a* is closed by the shutter 180 to prevent intrusion of dust from the window 51*a*.

As shown in FIG. 15, a part of the curved mirror 42 faces the window 51*a*, and dust may adhere on a surface of the curved mirror 42 through the window 51*a*. Therefore, as to an example embodiment, an antifouling coat 42*a* may be coated on the surface of the curved mirror 42. Further, as to an example embodiment, the antifouling coat 42*a* has an antistatic effect. With the antistatic effect, adhesion of dust to a surface of the curved mirror 42 can be reduced, and the antifouling effect can be further enhanced. Further, as to an example embodiment, the antifouling coat 42*a* is connected to earth. With this configuration, electrification of the surface of the curved mirror 42 can be further prevented, and adhesion of dust can be reduced.

Further, the antifouling coat can be applied to the reflection mirror 41, in which the antifouling coat may have an antistatic effect, with which the antifouling effect can be further enhanced. Further, as to an example embodiment, the antifouling coat is connected to earth. With this configuration, electrification of the surface of the reflection mirror 41 can be further prevented, and adhesion of dust can be reduced.

Further, the antifouling coat 42*a* can employ material that can remove dust easily. If the antifouling coat 42*a* having enhanced dust removing performance is used, dust adhered on the curved mirror 42 can be removed by applying a cloth to the curved mirror 42 using a small jig through the window 51*a*.

Figure 16:
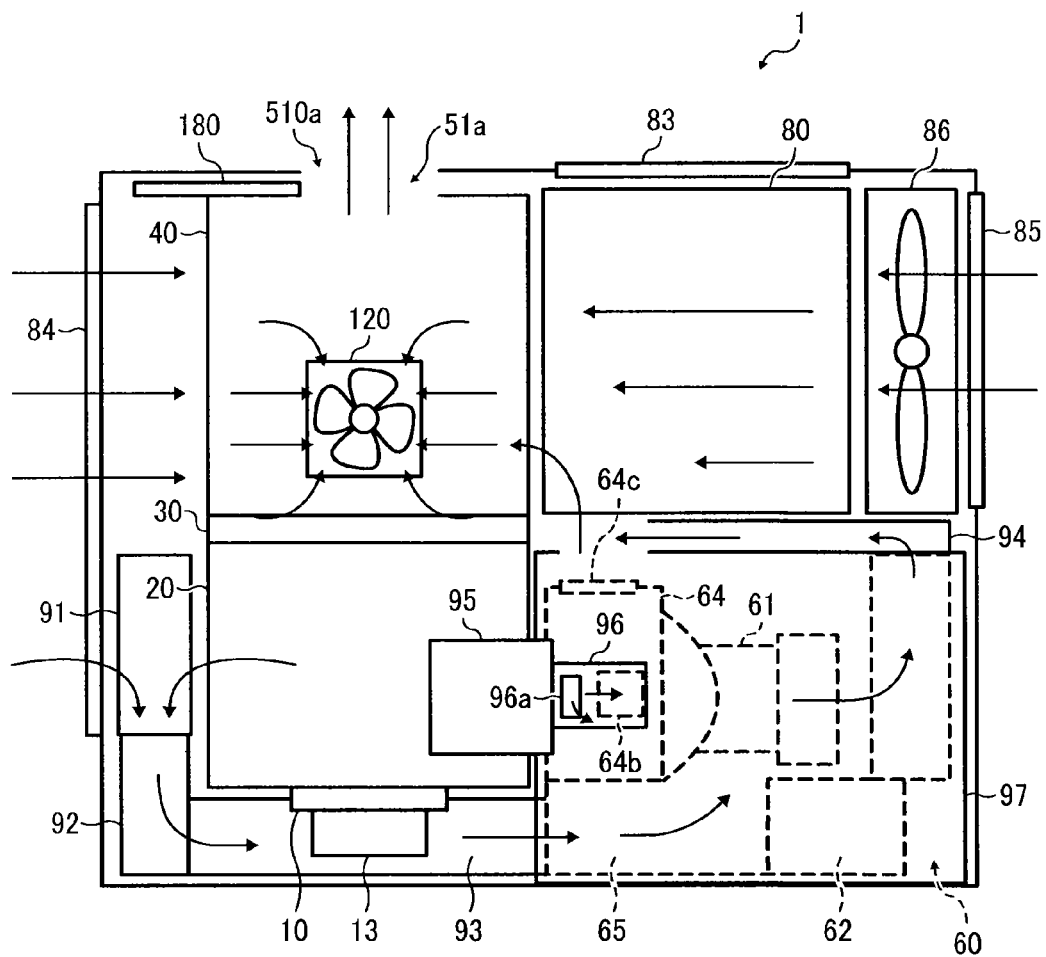
FIG. 16 shows a schematic view of airflow patterns in the projector.

FIG. 16 shows a schematic view of airflow patterns in the projector 1 according to an example embodiment. FIG. 16 shows the projector 1 viewed from the X direction, wherein the X direction is perpendicular to the projection plane 101. As shown in FIG. 16, the projector 1 includes the air-intake port 84 disposed its one face of the projector 1 (left side in FIG. 16), and the air-intake port 85 disposed its other face of the projector 1 (right side in FIG. 16). The air-intake port 84 has an opening to intake external air into the projector 1. The air-intake port 85 has an opening to intake air into the projector 1.

Further, as shown in FIG. 16, the air-intake fan 86 is disposed at a position facing the air-intake port 85. Air supplied into the projector 1 by the air-intake fan 86 flows to the power source unit 80 to cool the power source unit 80.

Further, a light source blower 95 is disposed at a position that can suck air around the color motor 21*a* (FIG. 5) that drives the color wheel 21 in the lighting unit 20. With this configuration, the color motor 21*a* and the light tunnel 22 can be cooled using the airflow generated by the light source blower 95.

The air sucked in by the light source blower 95 passes a light source duct 96, and then flows into a light-source air supply port 64*b* (FIG. 4) of the holder 64. Further, a part of the air flowing into the light source duct 96 flows into a space between a light source housing 97 and the outer cover 59 from an opening 96*a* formed on a face of the light source duct 96 opposing the outer cover 59. The air flowing into the space between the light source housing 97 and the outer cover 59 from the opening 96*a* of the light source duct 96 cools the light source housing 97 and the outer cover 59. Further, the air flowing to the light-source air supply port 64*b* flows into the light source 61 to cool the light source 61, and is then exhausted from the light-source air exhaust port 64*c* disposed on the top face of the holder 64.

An air-intake blower 91 is disposed at a lower side of the air-intake port 84 while facing the air-intake port 84. The air-intake blower 91 sucks external air from the air-intake port 84 via a side face of the air-intake blower 91 facing the air-intake port 84, and also sucks air from the body of the projector 1 from another side, opposite the side face of the air-intake blower 91 facing the air-intake port 84. Such air, sucked by the air-intake blower 91, flows in the vertical duct 92 disposed under the air-intake blower 91. The air flowing into the vertical duct 92 flows downward, and then flows to the horizontal duct 93 connected at the bottom of the vertical duct 92.

As shown in FIG. 16, the heat sink 13 is disposed in the horizontal duct 93. Therefore, the heat sink 13 can be cooled by the air flowing in the horizontal duct 93. By cooling the heat sink 13, the DMD 12 can be cooled effectively and efficiently, by which high temperature of the DMD 12 can be prevented.

The air flowing through the horizontal duct 93 flows into the pass-through area 65 or the opening 65*a* disposed for the light-source bracket 62 of the light source unit 60 (FIG. 4). The air flowing into the opening 65*a* flows through a space between the openably closable cover and the light-source bracket 62, and cools the openably closable cover, wherein the openably closable cover is opened when to replace the light source unit 60.

Meanwhile, the air flowing into the pass-through area 65 cools the light-source bracket 62, and then flows into a space opposite the light exit side of the light source 61 to cool a face of a reflector 67 so that the reflector 67 of the light source 61 is cooled, in which the face of the reflector 67 cooled by the air is a face opposite the reflection face of the reflector 67. Therefore, the air that passes through the pass-through area 65 can take heat from both of the light-source bracket 62 and the light source 61.

The air, which has passed near the reflector 67, passes through an exhaust duct 94, which is used to guide the air from the top side of the light-source bracket 62 to the lower side of the air-intake fan 86, and then converges into the air exhausted from the light-source air exhaust port 64*c*.

Then, the air exhausted from the light-source air exhaust port 64*c* is exhausted from an opening on a top face of the light source housing 97, and then converges into the air taken from the air-intake port 85 (right side of FIG. 16) and cooling the power source unit 80. The converged air, which is waste heat air that has cooled the DMD 12, the light source unit 60, and the power source unit 80, is sucked by the positive pressure fan 120. Further, the positive pressure fan 120 also sucks external air from the air-intake port 84 (left side of FIG. 16).

The waste heat air sucked by the positive pressure fan 120 and the external air taken from the air-intake port 84 (left side of FIG. 16) is exhausted from the second optical unit 40 through the window 51*a* and the exit port 510*a*.

In an example embodiment, by using the window 51*a* for a port of exhausting air, both openings at the left and right side of the projector 1 (see FIG. 16) can be used as the intake ports to intake air. With this configuration, heat generation devices in the projector 1 such as the light source unit 60, the power source unit 80, the DMD 12 and so on can be cooled efficiently and effectively.

Further, the air-intake port 85 and the air-intake fan 86 can be omitted. With this configuration, the number of parts can be reduced, and the cost of the projector 1 can be less expensive, and further, the rigidity of the projector 1 can be enhanced.

Figure 17:
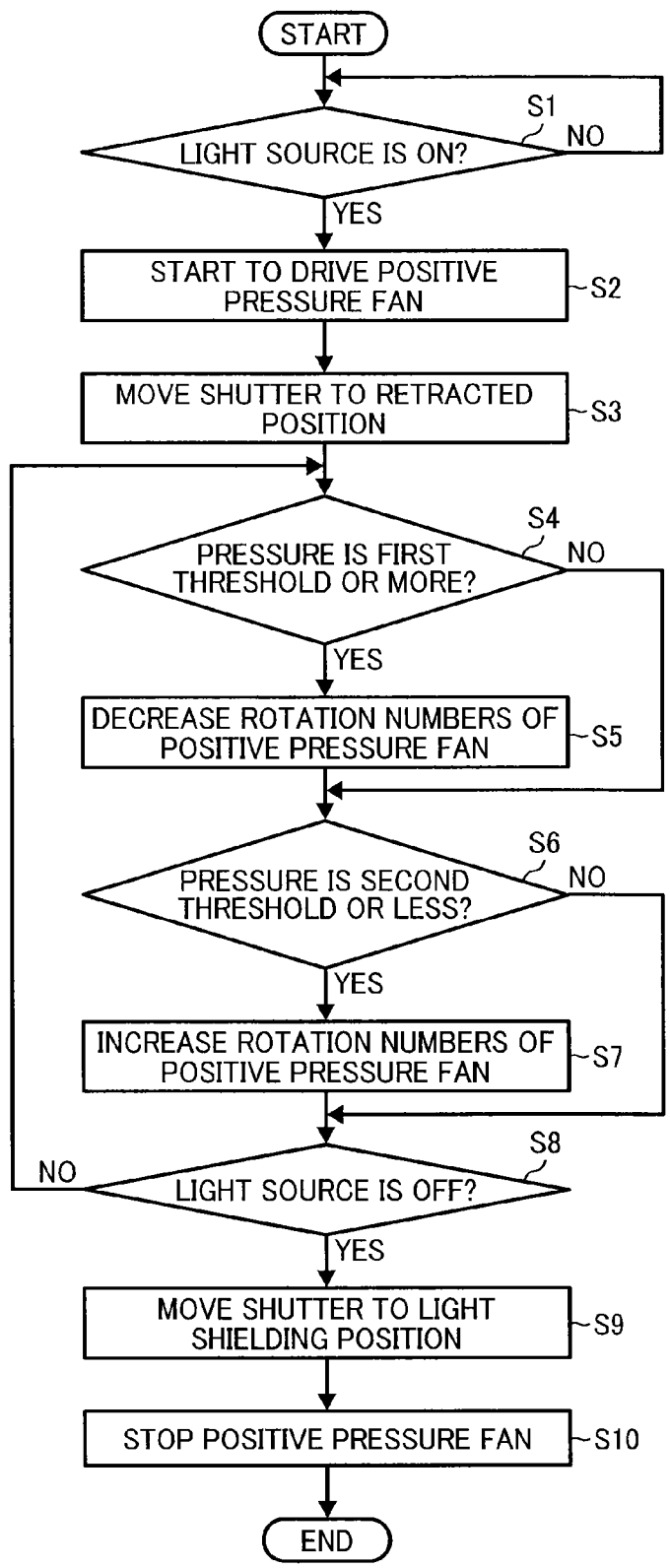
FIG. 17 is a flowchart showing steps of a control process of the projector.

FIG. 17 is a flow chart showing steps of controlling the projector 1. As shown in FIG. 17, when the projector 1 is at power-OFF condition, the shutter 180 closes the window 51a to prevent intrusion of dust into the second optical unit 40 through the window 51a. With this configuration, adhesion of dust to the curved mirror 42 and other parts when the projector 1 is not operated can be prevented.

When the projector 1 is at power-ON condition, the light source 61 is turned ON (S1: YES), and the control circuit 140 starts to drive the positive pressure fan 120 (S2) to inflow air into the second optical unit 40.

As to an example embodiment, the discharge face of the positive pressure fan 120 is attached to the mirror holder 45 at a position angled 90 degrees with respect to the opening face of the window 51a. With this configuration, as shown in FIG. 15, air intaken by the positive pressure fan 120 flows into the second optical unit 40, which is a parallel direction of the opening face of the window 51a.

Air inflowed into the second optical unit 40 by the positive pressure fan 120 is pushed by subsequently inflowing air, with which the air moves along the surface of the curved mirror 42, and then moves toward the window 51a, which is an upward direction side in FIG. 15.

As shown in FIG. 12, the window 51a is disposed at, for example, a substantially center of the top plate 51, and a size of area of the window 51a is set to a given size that is required to project a projection image on the projection plane 101. Therefore, the top plate 51 substantially covers a side of the curved mirror 42 of the second optical unit 40. Therefore, as shown in FIG. 15, the air flowing along the curved mirror 42 hits a face of the top plate 51 having the window 51a, and then flows in a direction parallel to the top plate 51. Therefore, the air inflowed in the second optical unit 40 flows under the window 51a, and hits the reflection mirror 41. The air that hits on the reflection mirror 41 flows down along the reflection mirror 41 toward the positive pressure fan 120. Then, the air flows toward the curved mirror 42 again due to an airflow inflowing from the positive pressure fan 120. As above described, as to an example embodiment, air is supplied into the second optical unit 40 by the positive pressure fan 120 to generate a whirl flow so that the air inflowed by the positive pressure fan 120 can circulate in the second optical unit 40, which is used as a chamber.

When the atmospheric pressure sensors 131 and 132 detect the positive pressure, the shutter 180 is moved to a retracted position (S3) to open the window 51a so that an image projection can be conducted. As such, when the pressure in the second optical unit 40 becomes the positive pressure, the window 51a is opened, with which dust intrusion from the window 51a can be prevented. In an example embodiment, a detection result of the atmospheric pressure sensors 131 and 132 is used, but not limited hereto. For example, the time measurement is started when the driving of the positive pressure fan 120 is started, and when a time that the pressure in the second optical unit 40 becomes the positive pressure is measured, the shutter 180 is moved to the retracted position, wherein the time that the pressure in the second optical unit 40 becomes the positive pressure can be determined in advance.

When the window 51a is opened, a part of the air hitting the top plate 51 and flowing under the window 51a can be pushed out by an internal pressure of the second optical unit 40 to the outside of the second optical unit 40 through the window 51a. The air remaining in the second optical unit 40 flows under the window 51a as same as the above, and then flows downward along the reflection mirror 41, and circulates in the second optical unit 40.

As to an example embodiment, as shown in FIG. 15, air inflowed by the positive pressure fan 120 is circulated in the second optical unit 40 to generate a whirl flow, in which air inflowed by the positive pressure fan 120 is not directly exhausted from the window 51a, but can be pushed out from the second optical unit 40 using the internal pressure of the second optical unit 40. With this configuration, the internal pressure of the second optical unit 40 can be maintained at positive pressure during an image projection operation, and dust intrusion from the window 51a can be reduced. Therefore, dust adhesion to optical parts such as the curved mirror 42 can be reduced.

Further, the control circuit 140 monitors pressure in the second optical unit 40 using the atmospheric pressure sensors 131 and 132. When one of the atmospheric pressure sensors 131 and 132 detects a pressure such as a first threshold pressure or more (S4: YES), the rotation numbers of the positive pressure fan 120 is decreased (S5). With this configuration, the rotation numbers of the positive pressure fan 120 can be reduced, with which noise such as wind roar by the positive pressure fan 120 can be reduced. Further, the power consumption of the positive pressure fan 120 can be reduced, with which an energy saving can be enhanced, and further, life time of the positive pressure fan 120 can be enhanced.

Further, when one of the atmospheric pressure sensors 131 and 132 detects a pressure such as a second threshold pressure or less (S6: YES), the rotation numbers of the positive pressure fan 120 is increased (S7), wherein the second threshold pressure is set smaller than the first threshold pressure (first threshold>the second threshold), and the second threshold pressure is set at an atmospheric pressure or more.

As to the second optical unit 40, the mirror bracket 43 and the free mirror bracket 44 or the like are fixed to the mirror holder 45 using screws. Therefore, air may leak from the second optical unit 40 through a gap between the mirror holder 45 and the mirror bracket 43, and through a gap between the mirror holder 45 and the free mirror bracket 44. As such, a plurality of gaps exist in the second optical unit 40 other than the window 51a, and air may be also exhausted from the second optical unit 40 through these gaps. The exhausting amount may vary depending on clearance of each parts and attachment conditions. Therefore, if the positive pressure fan 120 is rotated with given rotation numbers set in advance, the internal pressure of the second optical unit 40 may not be effectively maintained at the positive pressure condition.

In an example embodiment, based on a detection result of the atmospheric pressure sensors 131 and 132, the rotation numbers of the positive pressure fan 120 is controlled, with which the internal pressure of the second optical unit 40 can be maintained at the positive pressure effectively. With this configuration, dust intrusion from the window 51a can be prevented effectively. Further, although some air may leak from the gaps as above mentioned, because the air leaks from the gaps, dust intrusion through the gaps can be prevented. Specifically, dust intrusion through the gap between the mirror holder 45 and the mirror bracket 43, and dust intrusion through the gap between the mirror holder 45 and the free mirror bracket 44 can be prevented effectively.

When the light source 61 is turned OFF (S8: YES) and an image projection is ended, the control circuit 140 moves the shutter 180 from the retracted position to a light shielding position (S9) to close the window 51a. Upon closing the window 51a using the shutter 180, the driving of the positive pressure fan 120 is stopped (S10).

As above described, after closing the window 51a using the shutter 180, the driving of the positive pressure fan 120 is stopped, with which the window 51a is closed while maintaining the internal pressure of the second optical unit 40 is at the positive pressure condition. With this configuration, dust intrusion from the window 51a can be suppressed.

In an example embodiment, the discharge face of the positive pressure fan 120 is attached to the mirror holder 45 at a position angled 90 degrees with respect to the opening face of the window 51a, which means an angle between a perpendicular line of the opening face of the window 51a and an axis of the positive pressure fan 120 is set 90 degrees. With this configuration, air intaken by the positive pressure fan 120 flows into the second optical unit 40 with a direction parallel to of the opening face of the window 51a.

Further, another flow pattern can be used, in which air can be inflowed by the positive pressure fan 120 into the second optical unit 40 while not directly flowing to the window 51a. For example, air inflowed into the second optical unit 40 from the positive pressure fan 120 can be directed downward in FIG. 15, which is an direction opposite to the window 51a. Specifically, the positive pressure fan 120 can be attached to the mirror holder 45 by setting an angle between the perpendicular line of the opening face of the window 51a and the axis of the positive pressure fan 120 with an acute angle. In this configuration, air hitting a bottom face of the second optical unit 40 flows along a side face of the second optical unit 40 such as the curved mirror 42, and further flows toward the window 51a (i.e., upward direction), and hits the top plate 51. With this configuration, an airflow flowing under the window 51a can be generated, and the air inflowed into the second optical unit 40 by the positive pressure fan 120 can be circulated effectively in the second optical unit 40 (used as a chamber), in which the air is supplied into the second optical unit 40 by the positive pressure fan 120 to generate a whirl flow in the second optical unit 40. With this configuration, the internal pressure of the second optical unit 40, used as the chamber, can be maintained at the positive pressure condition during an image projection operation.

Further, as to an example embodiment, the shutter 180 is used as an opening and closing member that opens and closes the window 51a, wherein the shutter 180 can slide on the top plate 51, but other opening and closing member can be used. For example, a door member which can be pivoted on the top plate 51 can be used as the opening and closing member that opens and closes the window 51a.

Figure 18:
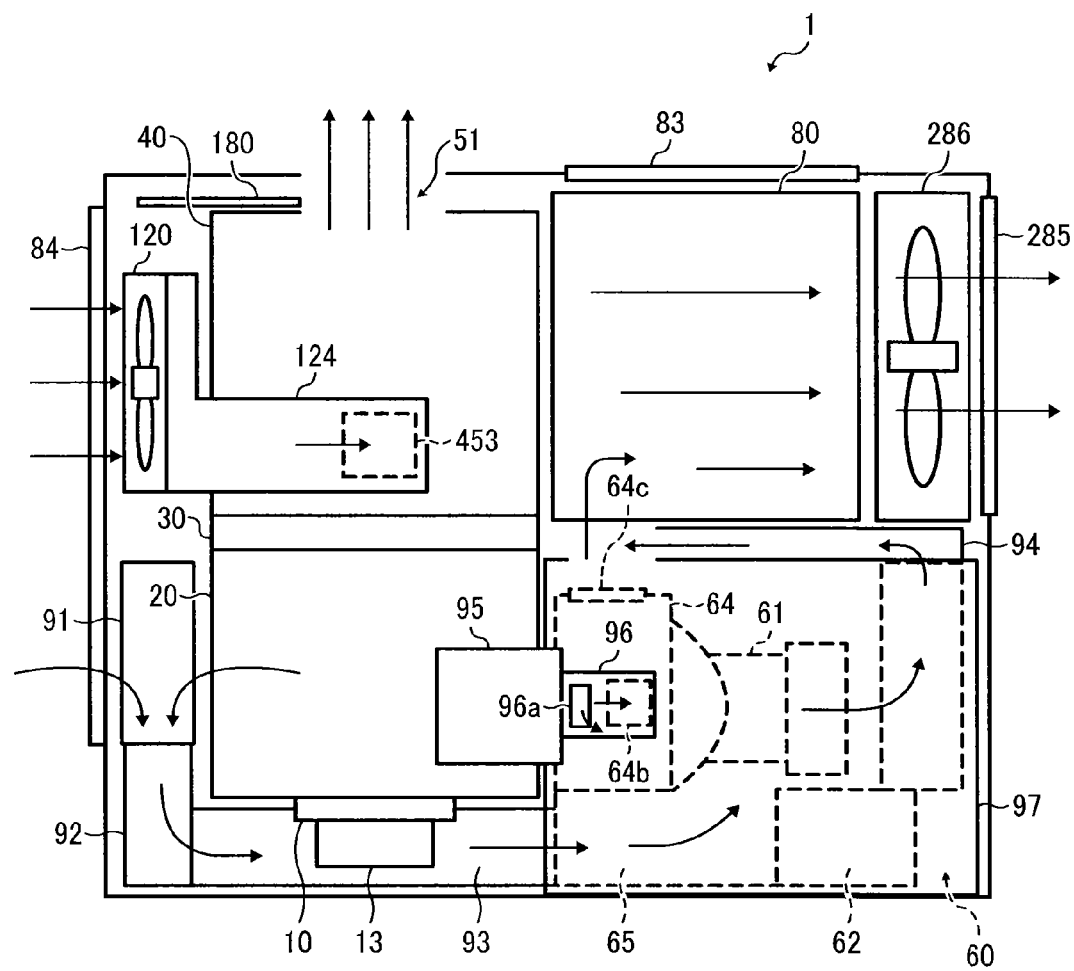
FIG. 18 is a variant example of the projector according to an example embodiment.

Further, depending on a configuration of the projector 1, the positive pressure fan 120 cannot be directly attached to the second optical unit 40. In this case, as shown in FIG. 18, the positive pressure fan 120 is attached to a duct 124, which is disposed inside the projector 1, in which air intaken by the positive pressure fan 120 can be inflowed into the second optical unit 40 via the duct 124. In another example configuration shown in FIG. 18, the positive pressure fan 120 is disposed at a position facing the air-intake port 84 of the projector 1, and external air is intaken from the air-intake port 84. Further, in another example configuration shown in FIG. 18, an opening port disposed at the right side of the projector 1 in FIG. 18 is used as an exhaust port, and an axial flow fan 286 is disposed at a position facing the exhaust port, in which the axial flow fan 286 can be used to exhaust the waste heat air, which is used to cool the light source unit 60, the DMD 12, and the power source unit 80, from the exhaust port.

The above described example embodiment of the image projection apparatus can be configured as follows.

The image projection apparatus such as the projector 1 includes optical parts such as the curved mirror 42 and the reflection mirror 41 disposed in a light path of an projection image; an enclosing unit such as the second optical unit 40 for enclosing the light path of the projection image and having the window 51a for projecting the projection image onto a projection plane, in which the second optical unit 40 including the mirror holder 45, the mirror bracket 43, the free mirror bracket 44 and the top plate 51 as an integrated unit; and an air supply unit such as the positive pressure fan 120 to supply air into an internal space of the enclosing unit such as the second optical unit 40 enclosing the light path. Pressure of the internal space of the enclosing unit for enclosing the light path is kept at a positive pressure with respect to an external pressure of the enclosing unit 1 during an image projection operation. With this configuration, as described in the above example embodiment, during an image projection operation, the internal pressure of the enclosing unit such as the second optical unit 40 used as the chamber can be maintained at positive pressure, and dust intrusion from the window 51a can be reduced.

Further, in the above described image projection apparatus such as the projector 1, the enclosing unit such as the second optical unit 40 has an internal configuration not to directly flow air, intaken by the air supply unit such as the positive pressure fan 120 into the space for enclosing the light path, to the window 51a. The enclosing unit has a face such as the top face 51 formed with the window 51a, and an airflow in the space for enclosing the light path flows toward the top face 51 and hits the top face 51 having the window 51a. With this configuration, as described in the above example embodiment, air supplied into the second optical unit 40 by the positive pressure fan 120 can be circulated in the space enclosing the light path in the second optical unit 40 to generate a whirl flow in the second optical unit 40. With this configuration, the internal pressure of the enclosing unit for enclosing the light path can be maintained at the positive pressure, with which dust intrusion from the window 51a can be suppressed.

Further, in the above described image projection apparatus, the air supply unit such as the positive pressure fan 120 is disposed at a position by setting an angle between a perpendicular line of the window 51a and an airflow direction of the positive pressure fan 120 at 90 degrees, or the positive pressure fan 120 is disposed at a position by setting an angle between the perpendicular line of the window 51a and the airflow direction of the positive pressure fan 120 at an acute angle. With this configuration, air intaken by the air supply unit such as the positive pressure fan 120 and inflowing into the space enclosing the light path such as the second optical unit 40 does not directly flow to the window 51a.

In the above described image projection apparatus, a part of the air intaken by the air supply unit such as the positive pressure fan 120 and inflowing in the space enclosing the light path is ejected from a plurality of gaps existing in the space enclosing the light path, wherein the gaps exist between the mirror holder 45 and the mirror bracket 43, and between the mirror holder 45 and the free mirror bracket 44. Even if such gaps exist, by maintaining the internal pressure of the enclosing unit for enclosing the light path at the positive pressure with respect to the external pressure, dust intrusion from the window 51a can be suppressed.

In the above described image projection apparatus, the enclosing unit retains the optical parts such as the curved mirror 42 and the reflection mirror 41. With this configuration, by maintaining the internal pressure of the enclosing unit retaining the curved mirror 42 and the reflection mirror 41 at the positive pressure, the rotation numbers of the air supply unit such as the positive pressure fan 120 can be reduced, and noise can be reduced.

In the above described image projection apparatus, the air supply unit such as the positive pressure fan 120 is attached to the enclosing unit such as the mirror holder 45 via the member having cushioning characteristics such as the pad 121. With this configuration, as described in the above example embodiment, transmittance of vibration of the positive pressure fan 120 during a rotation of the positive pressure fan 120 to the second optical unit 40 can be reduced, and vibration of the projection image projected onto the projection plane can be reduced.

In the above described image projection apparatus, the air supply unit uses an axial flow fan as the positive pressure fan 120. With this configuration, as described in the above example embodiment, cost increase of an apparatus such as the projector 1 can be suppressed.

Further, in the above described image projection apparatus, air intaken by the air supply unit such as the positive pressure fan 120 is supplied to the space for enclosing the light path via the duct 124. With this configuration, as described with reference to FIG. 18, even if the air supply unit such as the positive pressure fan 120 cannot be attached to the enclosing unit directly, the air supply unit can supply air to the space enclosing the light path.

Further, in the above described image projection apparatus, the dust remover such as the dust-proof filter 120a for removing dust can be disposed. Air intaken by the air supply unit such as the positive pressure fan 120 is supplied to the space for enclosing the light path after passing the air through the dust-proof filter 120a. With this configuration, as described in the above example embodiment, air can be supplied to the space enclosing the light path without dust.

Further, in the above described image projection apparatus, the optical parts such as the reflection mirror 41 and the curved mirror 42 are applied with the antifouling coat 42a. With this configuration, as described in the above example embodiment, stain on the reflection mirror 41 and the curved mirror 42 can be prevented.

Further, in the above described image projection apparatus, because the antifouling coat 42a can have an antistatic effect, as described in the above example embodiment, dust adhesion to the optical parts such as the curved mirror 42 can be reduced.

Further, in the above described image projection apparatus, because the antifouling coat 42a having an antistatic effect can be connected to earth, as described in the above example embodiment, electrification of the optical parts such as the curved mirror 42 can be further reduced, and dust adhesion to the optical parts can be further reduced.

Further, in the above described image projection apparatus, waste heat air that has cooled inside the image projection apparatus is flowed to the space for enclosing the light path. With this configuration, as described in the above example embodiment, an exhaust port other than the window 51a is not required for the image projection apparatus. With this configuration, the number of air intake ports can be increased to enhance the cooling efficiency of the image projection apparatus, or the rigidity of the image projection apparatus can be enhanced.

Further, in the above described image projection apparatus, the opening and closing member such as the shutter 180 is disposed for opening and closing the window 51a. With this configuration, as described in the above example embodiment, when the air supply unit such as the positive pressure fan 120 is stopped, the window 51a is closed by the opening and closing member such as the shutter 180, with which dust intrusion from the window 51a when the air supply unit is stopped can be prevented.

Further, the above described image projection apparatus further includes an atmospheric pressure detector such as the atmospheric pressure sensors 131 and 132 to detect atmospheric pressure of the space for enclosing the light path, and a controller such as the control circuit 140 to control the air supply unit such as the positive pressure fan 120 so that the pressure of the space for enclosing the light path becomes positive pressure based on a detection result of the atmospheric pressure detector. With this configuration, as described in the above example embodiment, the power consumption of the air supply unit such as the positive pressure fan 120 can be reduced while maintaining the positive pressure in the space enclosing the light path.

In the above described image projection apparatus, the pressure of an internal space of the enclosing unit used for enclosing light path becomes positive pressure with respect to the external pressure during an image projection operation, with which dust intrusion into the enclosing unit through the window 51a during an image projection operation can be reduced, in particular prevented. With this configuration, adhesion of dust to optical parts can be reduced, and deterioration of the projection image can be reduced.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image projection apparatus comprising:
   a reflection mirror and a curved mirror disposed in a light path of an projection image;
   an enclosure to enclose the light path of the projection image and having an window for projecting the projection image onto a projection plane; and
   an air supply which supplies air into an internal space of the enclosure enclosing the light path,
   wherein pressure of the internal space of the enclosure is kept at a positive pressure with respect to an external pressure of the enclosure during an image projection operation, and
   wherein the enclosure includes a top plate including the window, a mirror bracket which retains the reflection mirror and the top plate, a free mirror bracket which retains the curved mirror, and a mirror holder which holds the mirror bracket and the free mirror bracket.

2. The image projection apparatus of claim 1, wherein the enclosure has an internal configuration not to directly flow air, intaken by the air supply into the space for enclosing the light path, to the window,
   wherein the enclosure has a face formed with the window, and an airflow in the space for enclosing the light path flows toward the face and hits the face having the window.

3. The image projection apparatus of claim 2, wherein the air supply is disposed at a position by setting an angle between a perpendicular line of the window and an airflow direction of the air supply at 90 degrees, or wherein the air supply is disposed at a position by setting an angle between the perpendicular line of the window and the airflow direction of the air supply at an acute angle.

4. The image projection apparatus of claim 1, wherein a part of the air intaken by the air supply and inflowing in the space enclosing the light path is ejected from a plurality of gaps existing in the space enclosing the light path.

5. The image projection apparatus of claim 1, wherein the air supply is attached to the enclosure via a member having cushioning characteristics.

6. The image projection apparatus of claim 1, wherein the air supply is an axial flow fan.

7. The image projection apparatus of claim 1, further comprising a duct to which the air supply is connectable, wherein air intaken by the air supply is supplied into the space for enclosing the light path via the duct.

8. The image projection apparatus of claim 1, further comprising a dust remover for removing dust, wherein air intaken by the air supply is supplied to the space for enclosing the light path after passing the air through the dust remover.

9. The image projection apparatus of claim 1, wherein a surface of at least one of the reflection mirror or curved mirror is applied with an antifouling coat that suppresses stain.

10. The image projection apparatus of claim 9, wherein the antifouling coat has an antistatic effect.

11. The image projection apparatus of claim 10, wherein the antifouling coat having the antistatic effect is connected to earth.

12. The image projection apparatus of claim 1, wherein waste heat air that has cooled inside the image projection apparatus is flowed to the space for enclosing the light path.

13. The image projection apparatus of claim 1, further comprising an opening and closing member for opening and closing the window.

14. The image projection apparatus of claim 1, further comprising an atmospheric pressure detector to detect pressure of the space for enclosing the light path; and
a control circuit to control the air supply so that the pressure of the space for enclosing the light path becomes positive pressure based on a detection result of the atmospheric pressure detector.

15. The image projection apparatus of claim 1, wherein the mirror bracket is attached to an upper part of the mirror holder, the mirror bracket including an inclined side and a horizontal side.

16. The image projection apparatus of claim 15, wherein each end of the reflection mirror is pressed to the inclined side of the mirror bracket.

17. The image projection apparatus of claim 15, wherein each end of the top plate is pressed to the horizontal side of the mirror bracket.

* * * * *